United States Patent
Chen et al.

(10) Patent No.: US 8,549,276 B2
(45) Date of Patent: *Oct. 1, 2013

(54) UNIVERSAL OPERATING SYSTEM TO HARDWARE PLATFORM INTERFACE FOR GAMING MACHINES

(75) Inventors: Xuedong Chen, Reno, NV (US); Warner R. Cockerille, Sparks, NV (US); Steven G. LeMay, Reno, NV (US); Nadeem A. Quraishi, Reno, NV (US); Gregory A. Schlottmann, Sparks, NV (US); Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,150

(22) Filed: Aug. 27, 2012

(65) Prior Publication Data
US 2012/0324211 A1    Dec. 20, 2012

Related U.S. Application Data

(62) Division of application No. 13/049,506, filed on Mar. 16, 2011, now Pat. No. 8,281,118, which is a division of application No. 11/002,485, filed on Dec. 1, 2004, now Pat. No. 7,966,485.

(51) Int. Cl.
*G06F 9/00* (2006.01)
(52) U.S. Cl.
USPC .............................................. 713/2; 463/29
(58) Field of Classification Search
USPC .............................................. 713/2; 463/29
See application file for complete search history.

(56) References Cited

U.S. PATENT DOCUMENTS

| | | | |
|---|---|---|---|
| 4,727,544 A | | 2/1988 | Brunner et al. |
| 5,823,879 A | * | 10/1998 | Goldberg et al. ............... 463/42 |
| 6,006,285 A | | 12/1999 | Jacobs et al. |
| 6,012,984 A | * | 1/2000 | Roseman ........................ 463/42 |
| 6,409,602 B1 | | 6/2002 | Wiltshire et al. |

(Continued)

FOREIGN PATENT DOCUMENTS

| | | |
|---|---|---|
| WO | WO00/06268 | 2/2000 |
| WO | WO2004/004852 | 1/2004 |
| WO | WO2007/142821 | 12/2007 |

OTHER PUBLICATIONS

U.S. Office Action dated Jul. 14, 2010 issued in U.S. Appl. No. 11/002,485.

(Continued)

*Primary Examiner* — Chun Cao
(74) *Attorney, Agent, or Firm* — Foley & Lardner LLP

(57) ABSTRACT

Gaming machines and systems having a universal interface layer linking a gaming platform to a hardware platform are disclosed. In particular, the universal interface layer is configured such that the gaming platform is hardware platform independent and such that the hardware platform is gaming platform independent. Platform independence can facilitate the interchangeability of one platform without a corresponding need to modify the other platform. The gaming platform can include various gaming modules and an operating system, while the universal interface layer can include firmware, various additional gaming modules, hardware specific drivers and various APIs to facilitate communication between the gaming platform and other universal interface layer components. A safe storage manager can be included to utilize a non-volatile storage component to store data regarding a gaming machine state, with the state being recoverable after a substantial interruption to the machine.

15 Claims, 10 Drawing Sheets

(56) References Cited

U.S. PATENT DOCUMENTS

| | | |
|---|---|---|
| 6,669,562 B1 | 12/2003 | Shiino |
| 6,688,644 B2 | 2/2004 | Tsunoda et al. |
| 6,765,788 B2 | 7/2004 | Wu |
| 6,804,763 B1 | 10/2004 | Stockdale et al. |
| 6,806,889 B1 | 10/2004 | Malaure et al. |
| 7,600,105 B2 | 10/2009 | Tseng |
| 7,607,003 B2 | 10/2009 | Tseng |
| 7,966,485 B2 | 6/2011 | Chen |
| 8,281,118 B2 * | 10/2012 | Chen et al. ............ 713/2 |
| 2002/0052230 A1 | 5/2002 | Martinek et al |
| 2002/0183045 A1 | 12/2002 | Emmerson et al. |
| 2003/0064801 A1 | 4/2003 | Breckner et al. |
| 2003/0078103 A1 | 4/2003 | LeMay et al. |
| 2003/0130026 A1 | 7/2003 | Breckner et al. |
| 2003/0224858 A1 | 12/2003 | Yoseloff et al. |
| 2003/0228911 A1 | 12/2003 | Dernis et al. |
| 2004/0002381 A1 | 1/2004 | Alcorn et al. |
| 2004/0034764 A1 | 2/2004 | Bulusu et al. |
| 2004/0038740 A1 * | 2/2004 | Muir ............................ 463/40 |
| 2004/0088531 A1 | 5/2004 | Rothman |
| 2004/0193738 A1 | 9/2004 | Natu et al. |
| 2006/0116208 A1 | 6/2006 | Chen et al. |

OTHER PUBLICATIONS

U.S. Interview Summary dated Oct. 18, 2010 issued in U.S. Appl. No. 11/002,485.
U.S. Notice of Allowance and Examiner's Amendment dated Dec. 15, 2010 issued in U.S. Appl. No. 11/002,485.
U.S. Notice of Allowance dated Mar. 8, 2011 issued in U.S. Appl. No. 11/002,485.
U.S. Office Action dated Apr. 20, 2012 issued in U.S. Appl. No. 13/049,506.
U.S. Notice of Allowance dated Jul. 24, 2012 issued in U.S. Appl. No. 13/049,506.
AU Examiner's First Report dated Nov. 29, 2010 issued in Australian application No. 2005239694.
GB Search and Examination Report dated May 2, 2006 in United Kingdom application No. GB0524160.9.
GB Office Action mailed Dec. 3, 2007 in United Kingdom application No. 0524160.9.
GB Examination Report dated Aug. 8, 2008 issued in United Kingdom application No. 0524160.9.
GB Combined Search and Examination Report mailed Aug. 8, 2008 in United Kingdom Application No. 0805859.6.
GB Office Action mailed Mar. 23, 2009 in United Kingdom Application No. 0903263.2.

* cited by examiner

UNIVERSAL OPERATING SYSTEM TO HARDWARE PLATFORM INTERFACE FOR GAMING MACHINES

CROSS-REFERENCE TO RELATED APPLICATIONS

This application is a divisional of and claims priority to co-pending U.S. patent application Ser. No. 13/049,506 entitled "UNIVERSAL OPERATING SYSTEM TO HARDWARE PLATFORM INTERFACE FOR GAMING MACHINES" and filed Mar. 16, 2011 which claims priority to co-pending U.S. patent application Ser. No. 11/002,485, entitled "UNIVERSAL OPERATING SYSTEM TO HARDWARE PLATFORM INTERFACE FOR GAMING MACHINES" and filed Dec. 1, 2004 (which is now issued U.S. Pat. No. 7,966,485) all of which are hereby incorporated by reference for all purposes.

BACKGROUND OF THE INVENTION

1. Technical Field

The present invention relates generally to gaming machines and systems, and more specifically to gaming software architectures and related components for electronic gaming machines and systems.

2. Background

Modern scientific progress and technological advances have resulted in a growing variety of increasingly sophisticated and complex devices and machines. Many recently developed hardware items and components have resulted in electronic devices and machines with faster processing capabilities, increased storage capacities, better video presentations, higher quality audio systems and other improved features, often in more compact devices and at lower costs with respect to previous generation items and components. One unfortunate side-effect of continuing advancements in chips, boards and other electronic items is that software programs and architectures for computing units and systems can sometimes lag behind in development, and thus may not fully optimize or even make use of many capabilities of various emerging and recently developed electronics technologies. Devices with software structures and programs that might lag behind in this manner can include, for example, general-purpose computers such as a laptop or desktop personal computer ("PC"), among others. Software structures or routines that can be archaic in many PCs can include, for example, diagnostics, boot and initialization routines, among others.

To alleviate such problems, various organizations and industry leaders have begun to devise examples of and standards for improved software structures and programs that move away from those that tend to be relatively outdated and restrictive. One example of such a movement is the Extensible Firmware Interface ("EFI") and associated standards that have been recently promulgated by Intel Corporation of Santa Clara, Calif. for use in various newer generation electronics products. As is known, this EFI provides options and guidelines for using programs and running routines in a pre-boot environment of a PC based system, and examples of such can be found on the Intel web site at http://www.intel.com/technology/efi.

Another example of a class of electronic devices that have experienced a relative lag in software and hardware architecture development with respect to recent advances in electronic technologies is that of gaming machines. In a typical gaming machine, such as, for example, a video poker machine, blackjack machine, keno machine, or slot machine, among others, a game play is first initiated through a player wager of money or credit, whereupon the gaming machine determines a game outcome, presents the game outcome to the player and then potentially dispenses an award of some type, including a monetary award, depending on the game outcome. Although this process is generally true for both mechanical and electronic gaming machines, electronic machines tend to be more popular with players and thus more lucrative for casinos for a number of reasons, such as increased game varieties, more attractive and dynamic presentations and the ability to award larger jackpots.

Electronic gaming machines can include various hardware and software components to provide a wide variety of game types and game playing capabilities, with such hardware and software components being generally well known in the art. A typical electronic gaming machine can include hardware devices and peripheral such as bill validators, coin acceptors, card readers, keypads, buttons, levers, touch screens, coin hoppers, ticket printers, player tracking units and the like. In addition, each gaming machine can have various audio and visual display components that can include, for example, speakers, display panels, belly and top glasses, exterior cabinet artwork, lights, and top box dioramas, as well as any number of video displays of various types to show game play and other assorted information, with such video display types including, for example, a cathode ray tube ("CRT"), a liquid crystal display ("LCD"), a light emitting diode ("LED"), a flat panel display and a plasma display, among others. Software components can include, for example, boot and initialization routines, various game play programs and subroutines, credit and payout routines, image and audio generation programs, various component modules and a random number generator, among others. In addition, a typical electronic gaming machine comprises a central processing unit ("CPU") or master gaming controller ("MGC") that generally controls various combinations of hardware and software devices and components that encourage game play, allow a player to play a game on the gaming machine and control payouts and other awards.

It is well known that gaming machines are becoming more sophisticated, such that current software and hardware architectures are becoming too slow and inadequate to optimize the capabilities of newer technologies. Newer machines, such as those having "Wheel of Fortune," "Star Wars" or other similar themes, can require increasingly complex and demanding processing routines, as well as many different presentations, video and sound. Such requirements tend to result in a need for better processing capabilities and massive amounts of data storage, as well as improved communication and data transfer speeds. Because the costs and logistics of providing such capabilities become more prohibitive within the restrictive architectures of most electronic gaming machines, the overall qualities and functionalities of such gaming machines continue to lag behind those of other electronic devices and machines.

Many examples of current legacy architectures that can hinder the overall performance of a gaming machine involve the operating system ("OS") and many associated boot and initialization processes. As one particular example, the operating system on an electronic gaming machine usually requires knowledge of the specific hardware platform installed on that gaming machine in order to boot up. This can be particularly disadvantageous in that many gaming specific software modules are or can be designed to be completely hardware independent. Such software modules can include, for example, diagnostics, encryption and/or authenticator modules, among others. While the use of such modules in a pre-boot environment might be desirable for various reasons, implementations in this manner are rarely practical in current architectures where booting up an operating system must typically be done first or very early in a gaming machine start up or reset process.

In addition, the specific firmware linking the operating system and hardware platform in a given gaming machine usually has a number of limitations as well. Using the basic input/output system ("BIOS") of a gaming machine as one specific example, a typical gaming machine BIOS is written in assembler language and contains a number of legacy features that do not enhance the functionality of an advanced gaming machine, but rather detract from it in a number of ways. For example, a typical gaming machine BIOS contains disadvantages with respect to scalability, complexity, maintenance and compatibility, among others, as will be readily appreciated. For at least these reasons, it can be very difficult and tedious to write any customized application that runs before the operating system is started.

Furthermore, the very nature of many gaming machine architectures tends to render whole platforms in these devices as non-interchangeable. Current electronic gaming machine architectures generally include a specific game application, a general gaming platform, and a general hardware platform. The general gaming platform typically contains a base operating system, such as Windows CE or QNX, and a variety of gaming specific software modules, while the hardware platform generally contains the hardware and associated firmware of the gaming machine. Typically, too many components of a given gaming platform on an electronic gaming machine must be customized with respect to the actual hardware platform used on that gaming machine, with the consequence being that much of the gaming platform software for different gaming machines must be rewritten or redesigned for each different gaming machine. Of course, such customization can be very inefficient, particularly where the use and functions of many software modules and even portions of platforms are repeated, albeit in different forms as a result of the variances in hardware platforms. In addition, it is nearly impossible to replace or even substantially alter a hardware platform in a given gaming machine without replacing or making significant changes to the respective gaming platform in place.

In light of the foregoing issues, it would be quite advantageous to abstract the gaming platform from the hardware platform in a gaming machine as much as possible, such that the gaming platform would not need to be concerned with various hardware details in order to boot up the operating system. Not only would platform interchangeability then be a possibility, but a pre-boot execution environment could also be established to allow for the use of programs that would be compatible with more systems and that could be readily scaled. Accordingly, it is generally desirable to provide an electronic gaming machine hardware and software architecture that allows for better optimization of current electronic technologies, and in particular that such an architecture abstract the gaming platform from the hardware platform such that platform interchangeability and effective pre-boot environments are created.

SUMMARY

It is an advantage of the present invention to provide a gaming machine software and hardware architecture that creates a substantial level of independence between the gaming platform and hardware platform of the gaming machine. Such an architecture results in a general interchangeability of gaming and hardware platforms, as well as an effective pre-boot environment for the use of generic pre-boot modules and routines. Additional benefits include self-diagnostic, remote configuration and other pre-boot capabilities, a faster and more streamlined boot process, improved download capabilities, authentication, firmware updates and other processes that are gaming platform independent, virtual test device capabilities, and hardware specific encryption features, among others. Other advantages and benefits will become apparent upon examination of the following figures and detailed description.

The foregoing is accomplished in many embodiments of the present invention by providing within an electronic gaming machine a software structure that includes a universal interface layer linking the gaming platform and the hardware platform. According to several embodiments, the disclosed systems and methods involve the use or creation of a gaming machine adapted for accepting a wager, playing a game based on the wager and granting a payout based on the result of the game. Such a gaming machine can include various hardware components that collectively form a hardware platform, an exterior housing arranged to contain one or more hardware components, a variety of memory or storage components, and an MGC adapted to control various game aspects and to execute computer code from at least one of the storage components, some of which can be non-volatile in nature. Some of these storage components can contain computer code forming a software structure that includes a gaming platform and a universal interface layer that facilitates communication between the gaming platform and the hardware platform. In particular, the gaming platform can include at least some gaming modules and an operating system, and is also preferably hardware platform independent.

In one particular embodiment, at least one non-volatile storage component is adapted to store data regarding an overall state of the electronic gaming machine, with this data being recoverable after a substantial interruption to the operation of the gaming machine. This overall state can includes a variety of items, such as the amount of credits and the state of any game being played on the electronic gaming machine at the time of the interruption. In addition, the software structure can include a safe storage manager module that is configured to update the overall state of the gaming machine to the non-volatile storage component or components, preferably on a recurring basis. This safe storage manager can also be configured to restore the gaming machine to a part or all of the overall state stored at a non-volatile storage component. Such a substantial interruption to the gaming machine can include a power outage, a gaming machine reset, a critical hardware malfunction, a critical software malfunction and a gaming machine functional tilt, among other items.

In the foregoing embodiment, as well as others, the universal interface layer can include various software modules and at least one application program interface ("API"). Various APIs within the universal interface layer can form a universal interface to be used to facilitate communication between the gaming platform and various software modules also within the universal interface layer, as needed. Some of these software modules within the universal interface layer can be "universal function modules" that are essentially gaming platform independent, in that they are operable with virtually any gaming platform, such as a second gaming platform that is substantially disparate from the gaming platform that is actually used. Of course, such a second gaming platform is typically not simultaneously present with the original gaming platform in a given gaming machine, but the ability of the various universal function modules to be gaming platform independent can aid in the swapping of gaming platforms in an existing gaming machine, if desired. Such a universal nature for these particular modules generally results in no substantial changes to a module being necessary as a result of the specific gaming platform used.

In more specific embodiments, some of these universal function modules within the universal interface layer can also be essentially hardware platform independent, such that the foregoing properties also apply with respect to whatever hardware platform is used in a given gaming machine. It will be readily appreciated that various minor changes might be desirable in a given universal function module depending upon the actual gaming or hardware platform used, such as specific name and address designations. In more detailed embodiments, these universal function modules can include an application downloader module, an authentication module, a configuration module and/or a diagnostics module, among others.

In other embodiments, various storage components might not be included in the gaming machine, particularly where remote management or downloading abilities are included. Accordingly, such a gaming machine might then not include any storage components containing the foregoing software structures, but would at least include a master gaming controller that is configured to execute a software structure including a gaming platform and a universal interface layer linking the gaming platform to a hardware platform, where the gaming platform is again hardware platform independent. Various features and abilities of the universal interface layer as disclosed above and below may be included as well. For example, firmware specific to the hardware platform being used may reside on the universal interface layer itself. In addition, one or more of the universal function modules can be written in a high level computer language, such as C, for example, in addition to being gaming platform and/or hardware platform independent.

In other embodiments, a gaming system adapted for accepting wagers, playing games based on the wagers and granting payouts based on the results of the games is provided. Such embodiments can include any of the foregoing gaming machines within a larger gaming system or network. Alternatively, actual self-contained gaming machines may not be necessary, so long as various input and output devices forming at least a portion of a hardware platform are provided, as well as a master gaming controller that is in communication with at least one of the input and output devices, is adapted to control one or more aspects of the games, and is configured to execute a software structure including a gaming platform and a universal interface layer linking the gaming platform to the hardware platform, where the gaming platform is hardware platform independent. Additional components of such a gaming system can include a server in communication with the master gaming controller and configured to receive data regarding the play of one or more of the games controlled by the master gaming controller, a database adapted to store such data, and/or a cashier station adapted to authorize the payment of an award to a player based on the play of a game controlled by the master gaming controller.

Further embodiments can include a computer readable memory adapted to direct an electronic gaming machine to function in a specified manner, with such a computer readable memory including at least a game application software layer, a gaming platform software layer and a universal interface software layer. The game application software layer can include instructions for running a specific game involving a player wager and a potential payout based on the game result, while the gaming platform software layer can include an operating system and a first set of gaming modules adapted to perform various gaming machine functions. With this gaming platform software layer being hardware platform independent. The universal interface software layer is preferably adapted to facilitate communication between the gaming platform software layer and a specific hardware platform designed for use on the gaming machine. This universal interface software layer can include custom firmware adapted to run the specific hardware platform being used, a second set of gaming modules adapted to perform various gaming machine functions, one or more drivers, and one or more APIs adapted to facilitate communication between the gaming platform software layer and one or more items in the universal interface layer.

Similar to the foregoing embodiments, a safe storage manager can be included as a gaming module, preferably in the first set of gaming modules here. Also, the second set of gaming modules here can include one or more universal function modules operable in conjunction with a non-included second gaming platform without any substantial change to the universal function module. The second set of gaming modules can include an application downloader module, an authentication module, a configuration module, a diagnostics module, an initialization module, a resource allocation module and a resource detection module, among others, with one or more of these modules being written in a high level computer language, being gaming platform independent, and/or being hardware platform independent.

In still further embodiments, methods of manufacturing or converting gaming machines are provided. One method can include creating a standardized gaming platform, forming first and second hardware platforms, designing first and second universal interface layers, constructing first and second gaming machines, and installing the standardized gaming platform to both of the gaming machines. Another method involves converting a hardware platform of an existing gaming machine, which can include retaining on the gaming machine a standardized gaming platform, converting a first hardware platform residing on the gaming machine into a second hardware platform, and replacing a first universal interface layer on the gaming machine with a second universal interface layer. As in the foregoing embodiments, the standardized gaming platform is preferably hardware platform independent, and can include an operating system and one or more gaming modules adapted to perform various gaming machine functions. The first and second hardware platforms can be substantially disparate, with the first universal interface layer being adapted to facilitate communication between the standardized gaming platform and the first hardware platform and the second universal interface layer being adapted to facilitate communication between the standardized gaming platform and the second hardware platform. In the manufacturing method, the first gaming machine is constructed to contain the first hardware platform and first universal interface layer, while the second gaming machine is constructed to contain the second hardware platform and second universal interface layer.

In yet other particular embodiments, various apparatuses and methods involving a pre-boot environment in a gaming machine are provided. In addition to one or more elements or features from the foregoing embodiments being included in these particular embodiments, the master gaming controller is also adapted to execute one or more gaming software modules in a pre-boot environment. Such a pre-boot environment includes that which occurs during the period after an electronic gaming machine start or reset condition and before a base operating system is loaded. Such gaming software modules are preferably those contained within a universal interface layer, although alternative locations are also possible. These gaming software modules can include a boot manager module, an authentication module, a diagnostics module, an application downloader and a configuration module, among others.

In some variations on any of the foregoing specific embodiments, the master gaming controller is further configured to load and execute an operating system based on instructions from a boot manager module. Also, an authentication module may be used to authenticate this operating system prior to loading and executing the operating system. Further, an application downloader module can be used to download computer code to the gaming machine, with this computer code including one or more of a first game application, a first operating system, a second game application, and a second operating system. Yet another gaming software module can be used to monitor for an attachment of a new hardware component and/or a detachment of an existing hardware component. Any combination of these and other gaming software modules can be adapted for use in a pre-boot environment of the gaming machine, prior to boot and/or execution of an operating system.

In still further embodiments, various methods for starting an electronic gaming machine are provided. These methods can include various steps, such as those for activating a boot manager adapted to operate within a pre-boot system environment, reading a pre-boot system configuration for information regarding one or more pre-boot procedures, loading and executing one or more gaming software modules to the master gaming controller, and loading and executing a base operating system to the master gaming controller. In particular, some or all of the former steps may be performed prior to executing the base operating system. Additional steps that can be performed before executing the base operating system can include establishing communications between a hardware component and the master gaming controller, reading metadata for the hardware component from that hardware component, authenticating the base operating system and performing a self-diagnostics routine, among others. Of course, such steps are preferably performed by one or more of the pre-loaded gaming software modules prior to executing the base operating system.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods involving a universal interface layer and/or universal interface within a gaming machine or gaming system. These drawings in no way limit any changes in form and detail that may be made to the invention by one skilled in the art without departing from the spirit and scope of the invention.

DETAILED DESCRIPTION

Figure 1:
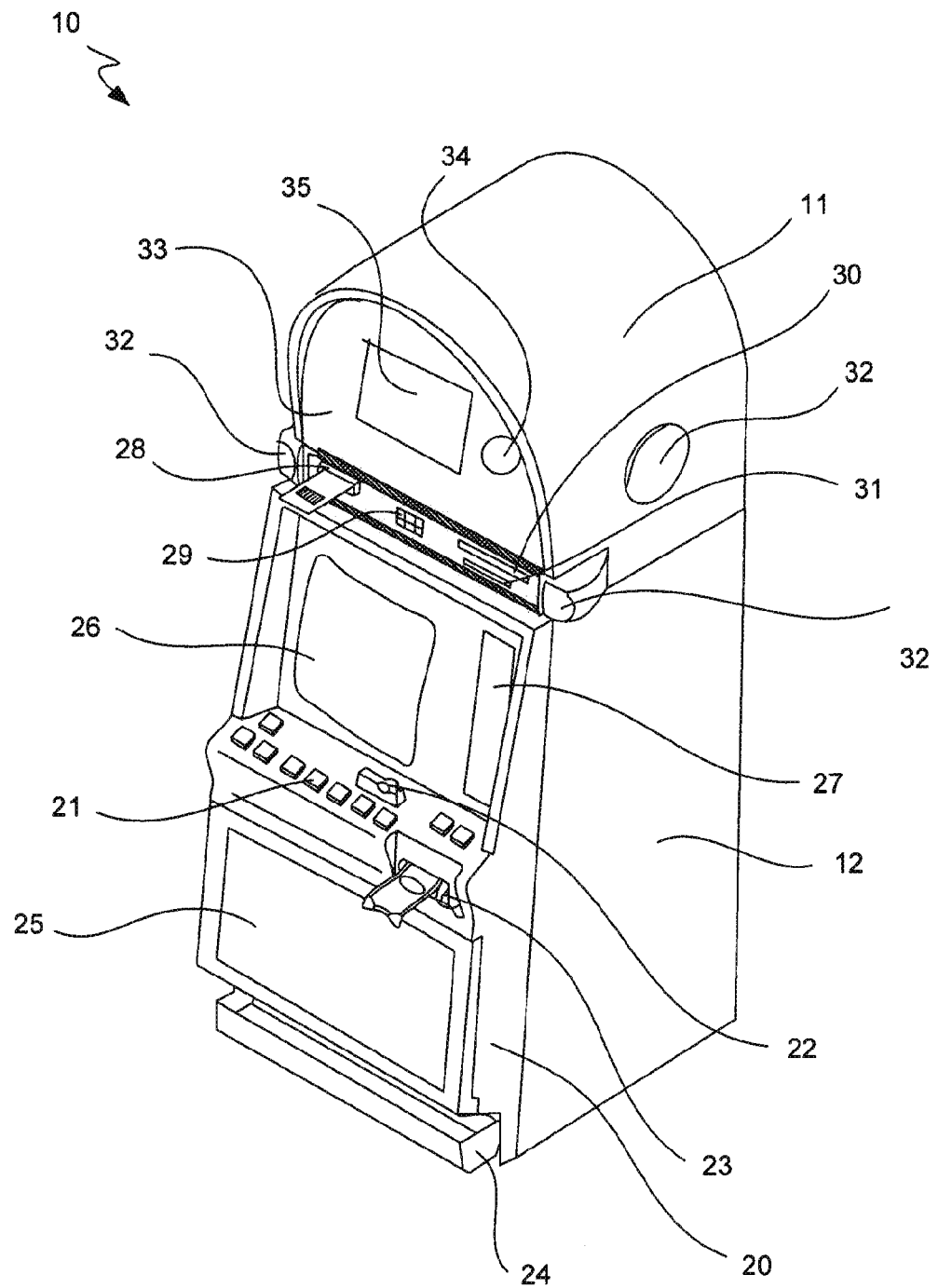
FIG. 1 illustrates in perspective view an exemplary electronic gaming machine.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

One advantage of the present invention is the introduction of a gaming machine architecture having a universal interface layer between the gaming platform and hardware platform of the gaming machine, such that these platforms can be relatively independent of each other. Such a structure can result in a general interchangeability of gaming and hardware platforms, and also create an effective pre-boot environment to enable the use of pre-boot modules and routines. A variety of benefits and added features can be realized with such an arrangement, as noted above, such that the more advanced electronics technologies can be better implemented and optimized within electronic gaming machines. In addition to faster and improved functionality within a gaming machine, modularity of gaming and hardware platforms can also be realized.

Although the present invention is directed primarily to gaming machines and systems, it is worth noting that some of the apparatuses, systems and methods disclosed herein might be adaptable for use in other types of devices or environments, such that their use is not restricted exclusively to gaming machines and systems. In fact, it will be readily appreciated that a wide variety of machines and devices can be used in conjunction with the inventive apparatuses, systems and methods disclosed herein. Such other devices can be specialized gaming devices that do not amount to actual gaming machines, as well as any other device that can be implemented with the inventive hardware and software architectures disclosed and detailed herein. Such other adaptations may become readily apparent upon review of the following detailed description. Although it will be understood that such other applications can be used with the inventive systems and methods disclosed herein, the discussion here shall focus on examples involving actual gaming machines for purposes of clarity.

The remainder of the detailed description herein first provides general discussions of gaming machines and of typical hardware and software architectures for electronic gaming machines in particular. Following that, specific embodiments of specialized gaming machines having better hardware and software architectures are provided. Next, discussion of the initialization process and pre-boot environment in a specialized gaming machine is provided, after which exemplary network and system configurations are given. Finally, methods of manufacturing or converting gaming machines that have the inventive architectures disclosed herein are given.

Gaming Machines

Referring first to FIG. 1, an exemplary gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket printer 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above.

With respect to the basic gaming abilities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Other features and functions may also be used in association with gaming machine 10, and it is specifically contemplated that the present invention can be used in conjunction with such a gaming machine or device that might encompass any or all such additional types of features and functions. Gaming machines such as these and other variations and types are made by many manufacturers, such as, for example, IGT of Reno, Nev.

With respect to electronic gaming machines in particular, the electronic gaming machines made by IGT are provided with special features and additional circuitry that differentiate them from general-purpose computers, such as a laptop or desktop personal computer. Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. Descriptions and examples of current gaming machine architectures can be found in a variety of references, and various discussions of hardware and software structures for an electronic gaming machine are disclosed in, for example, commonly assigned U.S. Pat. No. 6,804,763 by Stockdale, et al., entitled "High Performance Battery Backed RAM Interface;" as well as commonly assigned and co-pending U.S. patent application Ser. No. 10/040,239, by LeMay, et al., entitled "Game Development Architecture That Decouples The Game Logic From The Graphics Logic;" and Ser. No. 10/041,242, by Breckner, et al., entitled "Decoupling Of The Graphical Presentation Of A Game From The Presentation Logic," each of which is incorporated herein in its entirety and for all purposes. A general description of many specializations in electronic gaming machines relative to general-purpose computing machines and specific examples of additional or different components and features found in such electronic gaming machines now follows.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history or "state" information can include information regarding the amount of credits on the machine, the state of any game in progress, data regarding previous games played, amounts wagered, and so forth, any or all of which can be stored in a non-volatile memory device. This feature allows the state of the gaming machine to be recovered in the event of a substantial interruption to the gaming machine, which can include a power outage, a gaming machine reset, a critical hardware malfunction, a critical software malfunction and a gaming machine functional tilt, among other items, as will be readily appreciated. This is critical to ensure that correct wagers, credits and other important informational items are preserved.

Typically, battery backed RAM devices or other similar components are used to preserve this critical data. These memory devices are not used in typical general-purpose computers. Also, the software structure on the gaming machine can include a safe storage manager module that is configured to update the overall state of the gaming machine to the non-volatile storage component or components, preferably on a recurring basis. This safe storage manager can also be configured to restore the gaming machine to a part or all of the overall state stored at a non-volatile storage component. Further details of state based storage and recovery processes in a gaming machine are disclosed in commonly assigned U.S. Pat. No. 6,804,763, which is again incorporated herein by reference in its entirety and for all purposes.

In addition, substantial interruptions to the gaming machine are typically monitored for by one or more system managers, such as, for example, a tilt manager. Machine properties such as power level, temperature, electrostatic level and other factors are monitored, and cautionary signals or tilt generation instructions are sent and acted upon as appropriate when one or more of these properties of the gaming machine crosses a set tolerance level for whatever reason. Details of such property monitoring and tilt generation processes in a gaming machine are disclosed in commonly assigned and co-pending U.S. patent application Ser. No. 09/954,816, by Breckner, et al., entitled "Modular Tilt Handling System," which is incorporated herein by reference in its entirety and for all purposes.

Continuing further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general purpose computers.

Gaming Machine Architecture

Figure 2A:
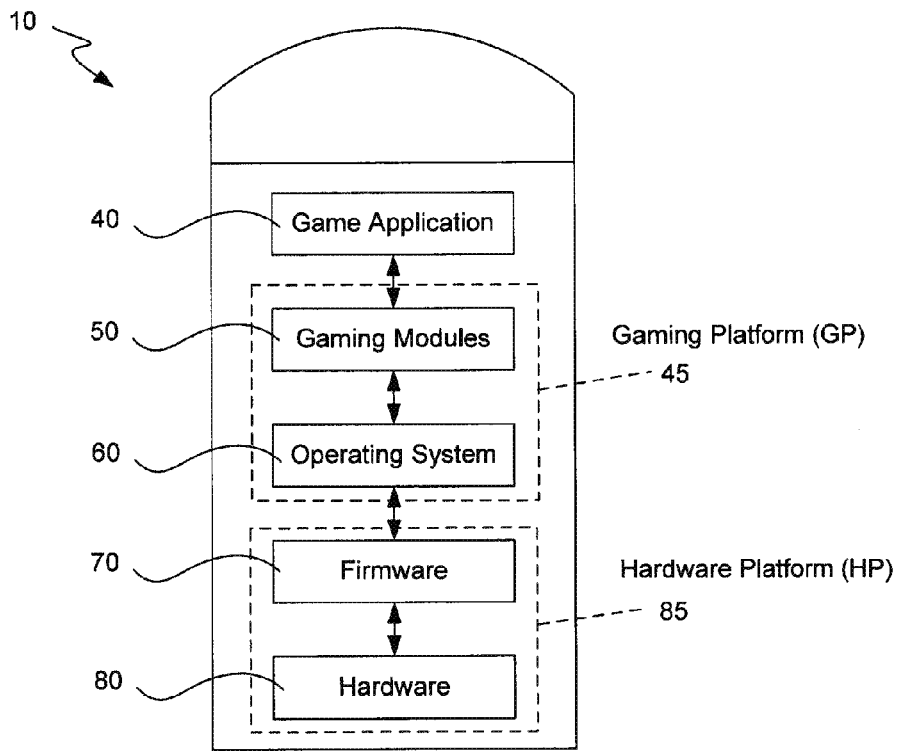
FIG. 2A illustrates a block diagram of an exemplary software and hardware architecture for the electronic gaming machine of FIG. 1.

Moving next to FIG. 2A, an exemplary software and hardware architecture for the electronic gaming machine of FIG. 1 is illustrated in block diagram format. The software and hardware architecture for gaming machine 10 can be broken down into five major categories, with those being the game application 40, the gaming modules 50, the base operating system 60, the firmware 70 and the hardware 80. Of these categories, the game application 40 tends to be the most specific, as this is the software for the actual game or set of games that are played on the gaming machine. Such game applications include the specific software to run specific game titles, such as, for example, a "Wheel of Fortune" game, a "Star Wars" game, a "Drew Carey" game, a "Deuces Wild" video poker game, or a "Lucky 7s" slots game, among others. The operating system 60 is generally the base OS that runs the gaming machine, and can be QNX, Windows CE, another commercially available operating system, or any custom designed operating system, such as the customized operating system used by IGT for its 960i class of gaming machines.

In general, a given operating system 60 tends to be the same or similar across numerous gaming machine titles within a gaming machine class, such as the 960i or Advanced Video Platform ("AVP") classes of gaming machines made by IGT. For example, all AVP gaming machines presently use a QNX operating system. The operating system 60 generally combines with the gaming modules 50 to form what is known as the "gaming platform" 45. Gaming modules 50 generally include many or all of the software modules and routines outside of the operating system 60 that are needed to run a given game application 40 with a given operating system and given sets of firmware 70 and hardware 80 on a gaming machine. Accordingly, differences in the gaming platform from gaming machine title to title within a class of gaming machines using the same operating system generally occur in one or more of these gaming modules, specific examples for which are provided below.

As is generally known in the art, the hardware 80 for a gaming machine can include any number of a wide variety of peripheral devices and other physical components, while the firmware 70 for the gaming machine generally includes the software that is needed to run these various peripheral devices and other hardware components. Firmware 70 is generally inserted into resident programmable read-only memory somewhere on the gaming machine, but can also be downloadable or otherwise provided, if desired. In general, the firmware 70 and hardware 80 combine to form what is known as a "hardware platform" 85. It is generally known in the art that this hardware platform 85 tends to change from gaming machine title to title, particularly where unique displays, bonus games, top box dioramas and/or other features are used in a given gaming machine title. In fact, a hardware platform can even change for different versions of a single given gaming machine title. As one example, the "Wheel of Fortune" title has at least seven different versions of gaming machines, with the hardware platforms for some versions being incompatible with the gaming platforms of others.

Figure 2B:
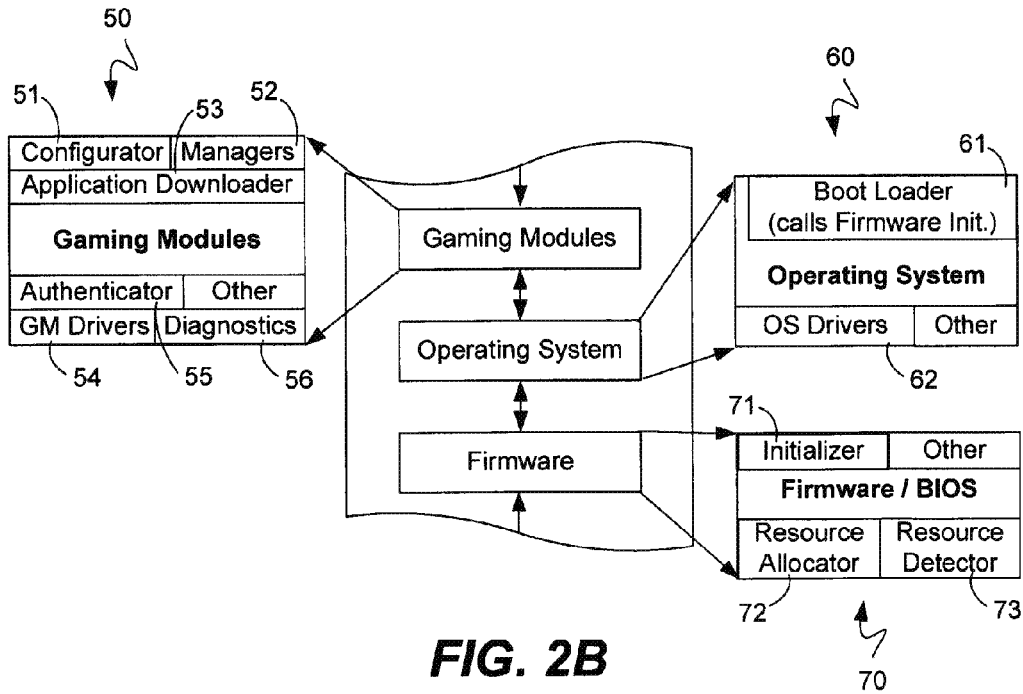
FIG. 2B illustrates further details for an isolated portion of the gaming machine architecture shown in the block diagram of FIG. 2A.

Continuing on to FIG. 2B, further details for an isolated portion of the gaming machine architecture shown in the block diagram of FIG. 2A are shown. In particular, more specific components for the gaming modules 50, operating system 60 and firmware 70 portions of the software and hardware architecture for electronic gaming machine 10 are provided. The gaming modules 50 include various items such as a configurator 51, various managers 52, an application downloader 53, various gaming machine drivers 54, an authenticator 55 and a diagnostics module 56, among others. A huge variety of items can be included within one or more of these portions of the gaming modules 50 category, with examples including, but not limited to, a gaming system, graphics engine, sound system, resource manager, game manager, bank manager, event manager, progressive manager, security guard, locale manager, system manager, presentation manager, tilt manager, system I/O controller, E2 driver, coin acceptor driver, bill validator driver, handle driver, hard meter driver, button panel driver, printer driver, hopper driver, light controller, USB peripheral driver, EEPROM manager, and safe storage manager, among others.

The operating system 60 includes various standard items, such as, among others, various operating system drivers 62, as well as a basic boot loader 61, which is typically configured to call an initialization routine or other similar program from the firmware during a start up or boot process. The operating system drivers 62 can include a number of specific items, with examples including, but not limited to, a file system driver, networking driver, USB bus driver and controller, PCI bus, and EIDE driver, among others. The firmware 70 or BIOS includes an initializer 71 or other similar initialization routine or program, as well as additional modules such as a resource allocator 72 and resource detector 73, among others.

As will be readily appreciated, various software modules, routines and other items within both the gaming platform 45 and the hardware platform 85 are typically designed and written with respect to those specific items or components that are anticipated to be within the other platform, such that many of the software modules, routines and/or components are truly customized for a given gaming machine title. As a result, much of the gaming platform for a given gaming machine title is designed or written for the specific hardware platform to be used with that gaming machine title. For example, the gaming modules 50 for a current "Star Wars" gaming machine include many drivers and managers that are specifically written to handle the coordination of game play with multiple complex video screens and audio presentations, among other details.

Figure 3A:
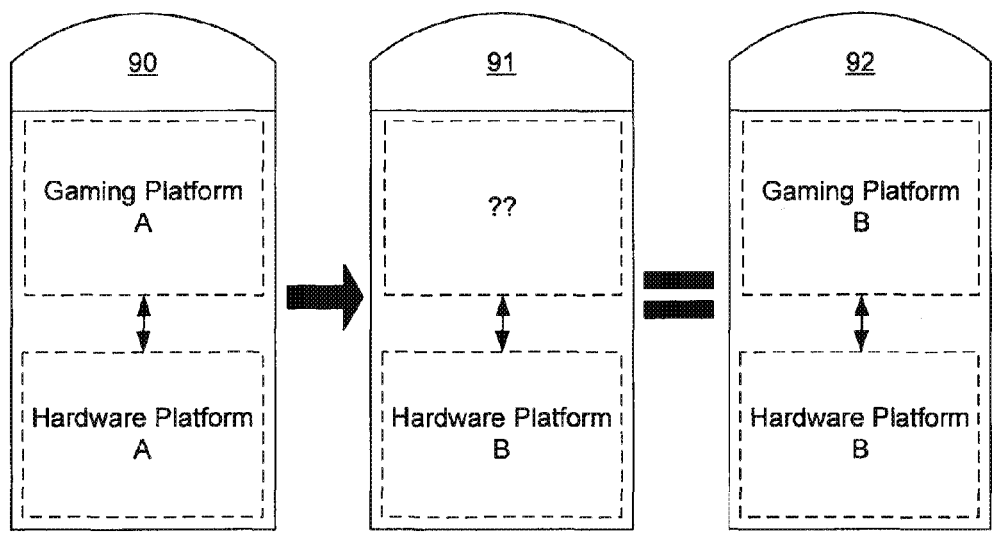
FIG. 3A illustrates in block diagram format one exemplary result of converting the hardware platform in an electronic gaming machine.

As noted above, one of the drawbacks for such an arrangement is that the gaming platform must be custom designed and written, such that interchangeability across different gaming machine titles is usually impractical or impossible. FIG. 3A illustrates in block diagram format one exemplary result of converting the hardware platform in a current existing electronic gaming machine. Gaming machine 90, which can be substantially similar to gaming machine 10 of FIGS. 1, 2A and 2B, contains a given gaming platform A and a given hardware platform A that are compatible with each other. If it is desired to alter the hardware platform A of this gaming machine substantially, such as, for example, by adding a bonus display, a progressive meter, an extra top box servo motor, and/or a new ticket printer, among other hardware items, then a different hardware platform B would be created. This is reflected in hypothetical gaming machine 91, which has hardware platform B and an unknown as its gaming platform to accompany this new hardware platform. Under the gaming machine software and hardware architecture described above, which architecture is currently used for most current electronic gaming machines, enough revisions or additions will need to be made to gaming platform A to effectively require a different gaming platform altogether to support this new hardware platform B. This result is reflected in resulting gaming machine 92, which has a gaming platform B to go with the new hardware platform B.

Figure 3B:
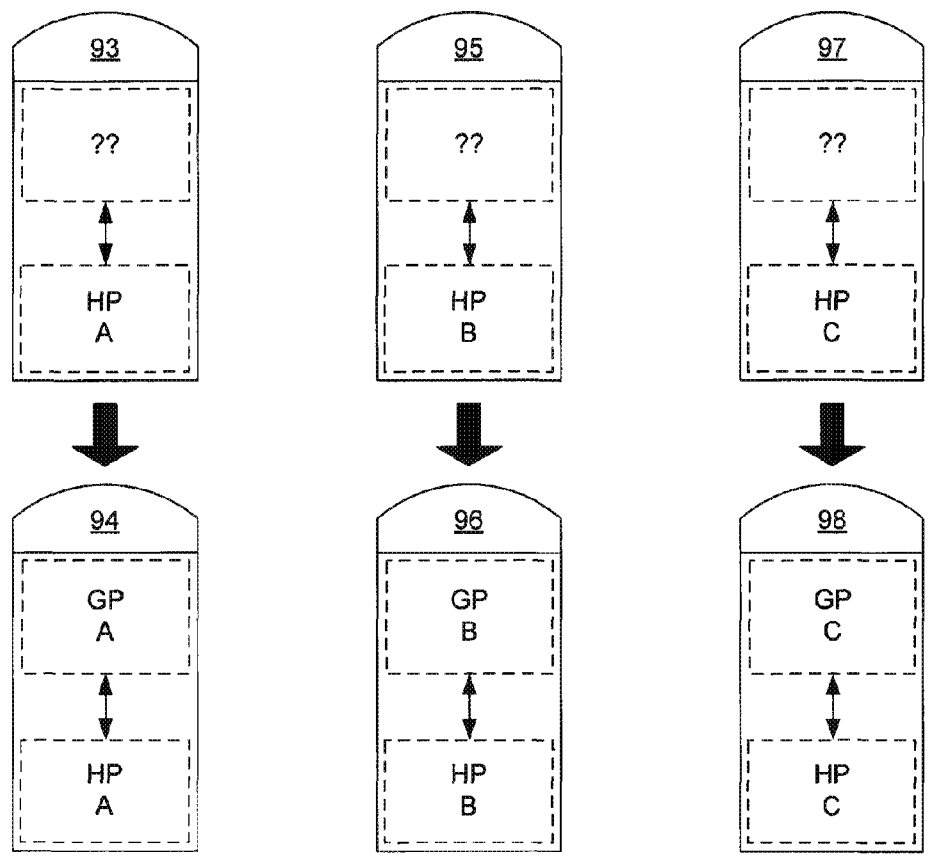
FIG. 3B illustrates in block diagram format one exemplary result of creating electronic gaming machines having disparate hardware platforms.

FIG. 3B illustrates in block diagram format one exemplary result of creating multiple electronic gaming machines having disparate hardware platforms. Gaming machines 93, 95, 97 are three different gaming machines to be originally manufactured, and all three are substantially similar in nature to gaming machine 10 described above with respect to their general software and hardware architectures. These gaming machines can have different titles altogether, or can all have the same title, with the notable difference between them being that each is to have a disparate or substantially different hardware platform. In particular, gaming machine 93 is to have hardware platform A, gaming machine 95 is to have hardware platform B, and gaming machine 97 is to have hardware platform C, with hardware platforms A, B and C being disparate from each other. The resulting gaming machines that are made turn out to be: gaming machine 94, having gaming platform A as compatible with hardware platform A; gaming machine 96, having gaming platform B as compatible with hardware platform B; and gaming machine 98, having gaming platform C as compatible with hardware platform C. Of course, gaming platforms A, B and C are also disparate with respect to each other. Thus, for any given hardware platform, a customized gaming platform must be designed, with at least some portions being custom written.

Specialized Gaming Devices

The foregoing examples illustrate just a few of the reasons why the design and creation of new gaming platforms or new hardware platforms can be so resource consuming and burdensome, in that the design of one such platform invariably results in the need to design a customized counterpart platform. In addition, none of the foregoing arrangements provides for any semblance of a pre-boot environment, the availability of which would be a huge asset for both gaming machine manufacturers and gaming operators for a variety of reasons.

Figure 4:
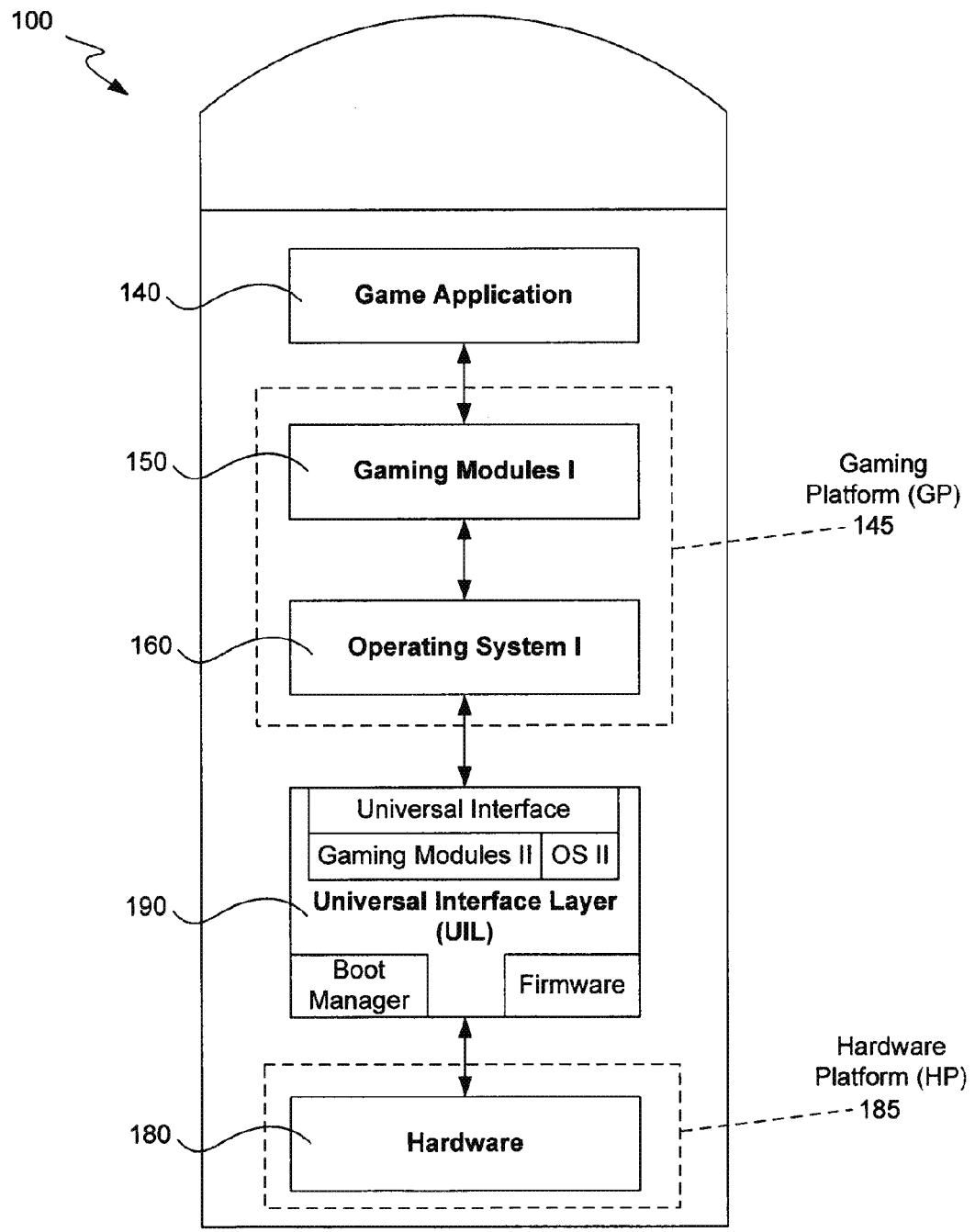
FIG. 4 illustrates a block diagram of an exemplary software and hardware architecture for a specialized gaming machine having a universal interface layer according to one embodiment of the present invention.

Turning now to FIG. 4, an exemplary software and hardware architecture for a specialized electronic gaming machine having a universal interface layer according to one embodiment of the present invention is illustrated in block diagram format. Electronic gaming machine 100 is similar in nature to electronic gaming machine 10 of the foregoing examples, and in fact can appear as identical or substantially similar in outward appearance, such that an additional figure showing an external perspective view would be duplicative and unnecessary. Similar to the foregoing examples, the software and hardware architecture for gaming machine 100 can be broken down into various major categories, with those being the Game Application 140, a first set of Gaming Modules I 150, a base Operating System I 1160, a Universal Interface Layer ("UIL") 190 and Hardware 180. Similar to the foregoing exemplary architectures, the Game Application 140 contains the specific game software application for the actual game or set of games that are played on gaming machine 100, while a set of Gaming Modules I 150 and base Operating System I 160 generally combine to form a Gaming Platform ("GP") 145. In addition, the Hardware 180 generally forms a Hardware Platform ("HP") 185 for gaming machine 100.

Unlike the foregoing examples, however, the Universal Interface Layer 190 is implemented within the software and hardware architecture of gaming machine 100 to provide a number of features and benefits that are not present in any of the prior examples, such as gaming machine 10. As one example, this UIL provides various APIs, some forming a Universal Interface, and other software modules in a software layer between the gaming platform and the hardware platform such that interchangeability of platforms can be accomplished. In some embodiments, the specific Gaming Platform 145 that is used in a given gaming machine 100 is completely independent of the specific Hardware Platform 185 that is used, such that an entire Gaming Platform can be designed, written and/or swapped out of an existing gaming machine without needing to swap out or substantially alter a given Hardware Platform 185 that is to be used. In addition, in some embodiments the specific Hardware Platform that is used in a given gaming machine is completely independent of the specific Gaming Platform that is used, such that the Hardware Platform can be designed and/or swapped out of an existing gaming machine without needing to swap out or substantially alter a given Gaming Platform that is to be used. Among its various components, the UIL can include data tables that contain platform-related information, as well as pre-boot and run-time services that are available to a pre-boot environment Boot Manager and the base operating system. This UIL provides a way for both the gaming platform and the specific firmware to communicate information necessary to support the operating system boot or initialization process. This is accomplished via a formal abstraction or separation of the hardware platform from the operating system and overall gaming platform by presenting only a set of software-visible custom APIs to the gaming platform as a Universal Interface, rather than specific firmware components.

Similar to the foregoing examples, the Operating System I 160 is generally the base OS that runs the gaming machine, and can be QNX, Windows CE, another commercially available operating system, or any custom designed operating system, such as the customized operating system used by IGT for its 960i class of gaming machines. Unlike the foregoing examples, however, some of the basic modules or drivers that are generally considered as part of or closely related to a standard base operating system can be placed in the UIL 190, as detailed below. Similarly, not all of the software modules and routines that would ordinarily be part of a gaming platform are included in the Gaming Modules I 150, but rather are placed in the UIL 190 as well, as detailed below. In addition, the UIL 190 can be designed to contain much or all of the Firmware for gaming machine 100, as well as a universal interface made up of various OS to UIL APIs to facilitate communications between the Operating System 160 and other parts of the UIL 190.

Figure 5:
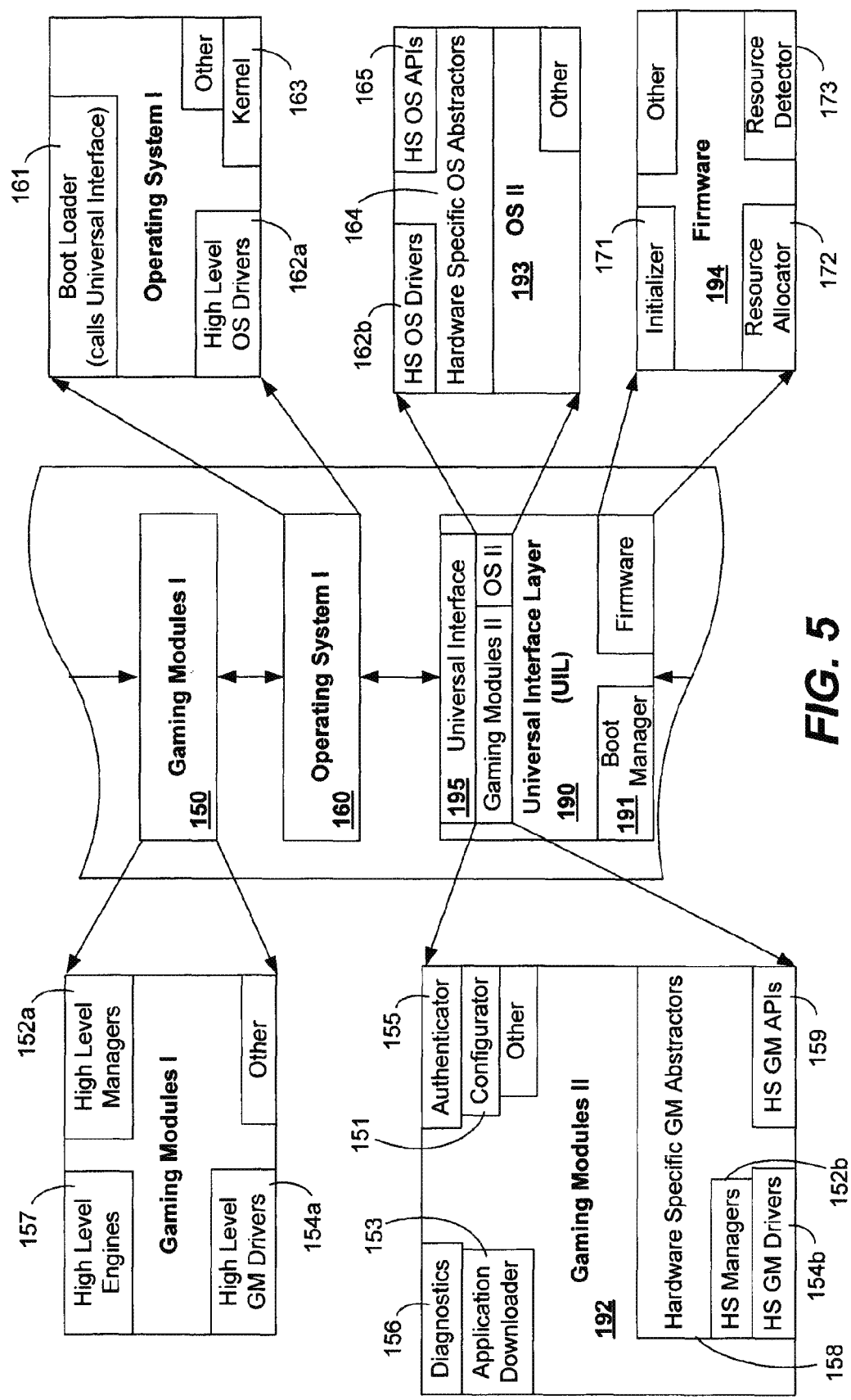
FIG. 5 illustrates further details for an isolated portion of the gaming machine architecture shown in the block diagram of FIG. 4 according to one embodiment of the present invention.

Continuing on to FIG. 5, further details for an isolated portion of the specialized gaming machine architecture shown in the block diagram of FIG. 4, including this UIL, are shown. In particular, more specific components for the Gaming Modules I 150, Operating System I 160 and Universal Interface Layer 190 portions of the software and hardware architecture for electronic gaming machine 100 are provided. Gaming Modules I includes those items that are specifically written to interact with a given Game Application 140 and base Operating System 160, and can include, for example, high level managers 152a, high level gaming machine drivers 154a and high level engines 157, among others. Various high level managers 152a can include, but are not limited to, for example, a resource manager (such as for script parsing and/or sound/video decompression), a game manager, a bank manager, an event manager, a progressive manager, a security guard, a locale manager, a system manager, a presentation manager and a tilt manager, among others. Various high level gaming machine drivers 154a can include, but are not limited to, for example, a system I/O controller, an E2 driver, a coin acceptor driver, a bill validator driver, a handle driver, a hard meter driver, a button panel driver, a printer driver, a hopper driver, a light controller and a USB peripheral driver, among others. Various high level engines 157 can include, but are not limited to, for example, a graphics engine, gaming system or sound system, among others.

The Operating System I 160 includes various standard components, such as a base OS like QNX or Windows CE that can also include for example, a kernel 163, various high level operating system drivers 162a, and a basic boot loader 161, which is preferably configured to call a particular API within the Universal Interface 195 itself of UIL 190 during a start up or boot process, among others. The high level operating system drivers 162*a* can include a number of specific items, with examples including, but not being limited to, a file system driver, a networking driver, a USB bus driver, a PCI bus driver and an EIDE driver, among others.

As noted above, the Universal Interface Layer 190 preferably contains a number of components, including a primary Boot Manager 191, a second set of gaming software modules in a Gaming Modules II component 192, a second set of operating system type items in an OS II component 193, some or all of the firmware type items for the gaming machine in a Firmware component 194, and a collection of APIs designed to facilitate communications between the Gaming Platform 145 and the remainder of the UIL 190 and Hardware Platform 185 in a Universal Interface component 195. It will be readily appreciated that this Universal Interface 195 may involve some customization and specific software writing, as this component is to include some or all of the APIs that are needed to facilitate communication and interoperability between high level and hardware specific gaming machine programs and components. Although some level of standardization with respect to addresses, callouts and the like is preferable, it is contemplated that one or more of the APIs within Universal Interface 195 will need to be written where a given gaming platform is to be compatible in a first instance with a given hardware platform. Still, the level of software design and writing should tend to be reduced substantially where such customization is made primarily in one or a few new APIs, as opposed to an entirely new platform, as is currently done. It will be appreciated that once they are first written, many of these custom APIs can also be reusable in large part or in their entirety for other applications involving the same or similar software modules, albeit in different combinations than have been previously made.

Alternatively, Universal Interface 195 can be made such that it contains a variety of APIs designed to facilitate communications between many or all possible gaming platforms and many or all possible hardware platforms. Such a design would result in a Universal Interface that would only need to be created and written once for all possible combinations of gaming and hardware platforms, thus streamlining the design and manufacturing process even further. In cases of such a static Universal Interface 195, differences and discrepancies between platforms can be accounted for in the various hardware specific abstractors located within the Gaming Modules II 192 and OS II 193 architectural components, as will be readily appreciated. Thus, the set of APIs forming the Universal Interface component 195 of Universal Interface Layer 190 can actually remain unchanged from gaming platform to gaming platform and from hardware platform to hardware platform.

Similar to the foregoing examples, the Firmware component 194 generally includes an initializer 171 or other similar initialization routine or program, as well as additional modules such as a resource allocator 172 and resource detector 173, among others. Referring now to both the OS II 193 and Gaming Modules II 192, it can be seen that both of these components contain one or more hardware specific abstractors. In general, an abstractor is an item that facilitates the processing of instructions, data transfer or other communications between an item in the gaming platform, such as the base operating system, and a specific hardware item, such as a printer, for example. Such an abstractor is preferable because the languages and/or protocols of the gaming platform item and hardware item are typically incompatible. These abstractors can include various hardware specific drivers and/or various specific APIs that permit a high level hardware independent driver to operate with a specific hardware item, as will be readily appreciated. Referring first to the OS II architectural component 193, various hardware specific OS abstractors 164 are provided, which can include one or more hardware specific OS drivers 162*b*, as well as one or more hardware specific OS APIs 165. Such abstractors, whether they be implemented as an actual driver or as an API, can include, for example, a PCI host controller abstractor, a USB host controller abstractor, a SCSI devices abstractor, a network adaptor abstractor and a video adaptor abstractor, among others.

Referring next to the Gaming Modules II architectural component 192, various hardware specific gaming module abstractors 158 are provided, which can include one or more hardware specific gaming module drivers 154*b* and/or one or more hardware specific managers 152*b*, as well as one or more hardware specific gaming module APIs 159. Such abstractors, whether they be implemented as an actual driver, manager or API to a specific hardware item, can include, for example, a button panel abstractor, a coin acceptor abstractor, a bill validator abstractor, an EEPROM abstractor, an NVRAM or safe storage abstractor, a printer abstractor and a hopper abstractor, among others. Other items can also be used as a hardware specific gaming module abstractor, such as, for example, a tilt manager abstractor designed for a specific piece or set of hardware. Based on these examples, other possibilities for hardware specific drivers, managers and such other items that would be appropriately located within a Gaming Modules II 192 component of the overall gaming machine architecture will be readily apparent to those skilled in the art.

In addition to the various abstractors 158 within the Gaming Modules II architectural component 192, a number of additional applications can also be located within this portion of UIL 190. Such additional items can include, for example, a configurator 151, an application downloader 153, an authenticator 155 and/or a diagnostics program 156, among others. These items are preferably in the form of software modules within the UIL 190, and one or more are preferably designed and written such that they are independent with respect to the actual Gaming Platform 145 used in the gaming machine and/or the actual Hardware Platform 185 used in the gaming machine. Such a module or application that is independent with respect to one or both platforms can be referred to as a "universal function module," in that it is adapted to perform its function or program universally regardless of the platform that is actually used in the gaming machine. This can be particularly useful in situations where a comprehensive and complex application can be written once in a high level computer language, such as C, and then used repeatedly in many gaming machines across various disparate platforms without having to rewrite or substantially change the application to account for these different platforms.

For example, a configurator application or module 151 can be written such that it is gaming platform independent and can therefore operate in conjunction with a variety of disparate base operating systems and overall gaming platforms that might be installed into a gaming machine. This configurator 151 would then be a universal function module, at least with respect to the actual gaming platform used, and would be adapted to configure the gaming machine (e.g., establish a specific processing environment, set the IP address of the machine on a network, etc.) in the same manner regardless of whether the actual gaming platform contained any specific high level resources manager, any specific high level system manager, a QNX operating system, a Windows CE operating system, or any other specific gaming platform component.

As another example, an authenticator application or module 155 can also be written such that it is gaming platform independent and can therefore operate in conjunction with a variety of disparate operating systems and gaming platforms that might be installed into a gaming machine. This authenticator 155 would then also be a universal function module with respect to the actual gaming platform used. Further, the authenticator could also be written such that it is hardware platform independent and could therefore operate in conjunction with a variety of disparate hardware platforms. This would then result in the authenticator being a universal function module with respect to the actual hardware platform that is used as well. As also noted below, this authenticator could be used to authenticate any application or program in the gaming machine prior to its execution, including, but not limited to, the base operating system, the specific Game Application and/or any other gaming module, as desired. In addition to configurator 151 and authenticator 155, application downloader program or module 153, diagnostics program or module 156 and/or one or more other applications or modules may also be designed and/or written such that they are independent with respect to the actual gaming platform 145 used, the actual hardware platform 185 used, or both.

Again, there are numerous advantages that can be attained through the use of such universal function modules within the Universal Interface Layer 190, and the types and functions of such modules are not limited to the few examples disclosed herein. Because these universal function modules can be used with numerous different gaming platforms and/or hardware platforms, such that custom designs or rewrites will typically not be necessary, much more attention, added functionality and greater complexity can be given to each one. For example, the authenticator module 155 can be designed and written as a universal authenticator in C, and can be adapted to authenticate any program to be run or installed on the gaming machine, including the base operating system, as desired. While it may be desirable to allow the functions of one or more of these universal function modules to be carried out in an ordinary run-time environment of the gaming machine, it is also preferable that one or more of these modules also be operable in a pre-boot environment. Using the authenticator 155 as an example again, the system can be designed such that this module is able to authenticate the operating system 160 before the operating system is installed and/or executed on the gaming machine after a start up or reset condition.

Referring lastly to the Boot Manager 191 of Universal Interface Layer 190, this Boot Manager is the central administrator that is activated to direct activities after a start up or reset condition in the gaming machine. After such a start up or reset, the Boot Manager 191 takes care of starting the right components, drivers, applications and other pre-boot items in a pre-boot environment, prior to executing the base operating system and establishing a standard run-time environment. This may involve performing one or more of these tasks before even booting the operating system into the MGC or other like component of the gaming machine, as set forth in greater detail below. Boot Manager 191 is effectively the application coordinator and launcher for all pre-boot activities, and as such launches and coordinates the various pre-boot applications and modules, which can include, for example, the configurator module 151, application downloader module 153, authenticator module 155, and diagnostics module 156, among others. A pre-boot configuration file for use by the Boot Manager 191 to load and run the various applications, drivers and other programs in the pre-boot environment and in the proper order is preferably stored within UIL 190, although other any of a number of other locations may also be used.

Boot Manager 191 can be implemented in any of a number of ways, and is preferably implemented as a first to act EPROM. Alternatively, it is contemplated that this Boot Manager could also be implemented as any first to act read only device, and could be stored on, for example, a floppy disk, CD-ROM, read only portion of a hard drive, or any other suitable storage device. Similarly, the code for one, several or all of the forgoing modules and architectural components of gaming machine 100 can be stored in one or more storage devices or memory units, with one, several or all of these devices or units being including within the gaming machine itself, as desired. Preferably, each of these storage devices is associated with the MGC and/or other appropriate processing unit or units of the gaming machine either directly or through an intermediary adapted to transmit code stored on the device to the appropriate MGC and/or other processing units. In addition, one or more of these modules, programs or applications can be stored at a remote location outside the gaming machine, such as on a network, with the application downloader 153 being appropriately adapted and configured to facilitate the transmittal of such remotely located programs to the gaming machine as needed.

Figure 6A:
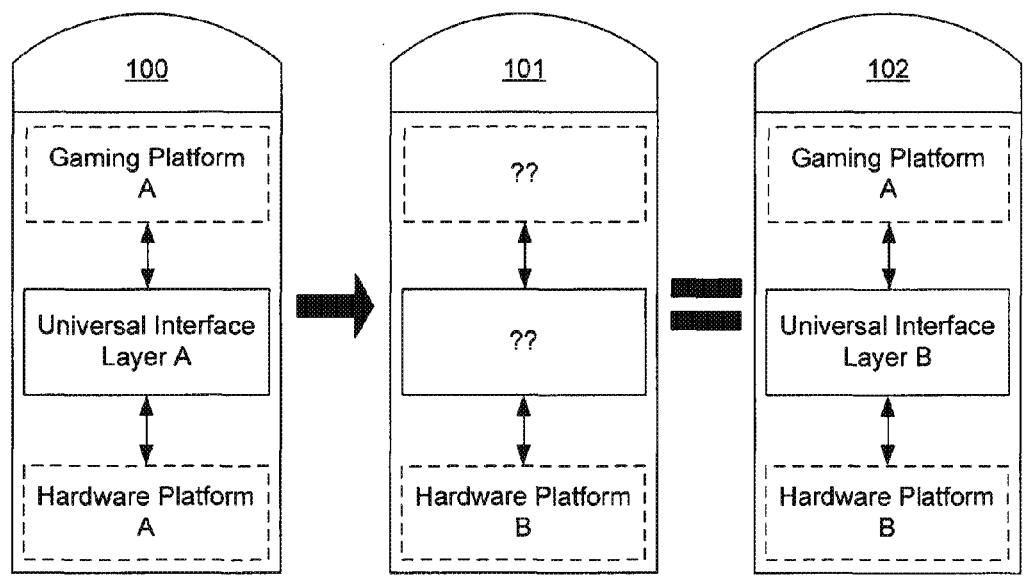
FIG. 6A illustrates in block diagram format one exemplary result of converting the hardware platform in a specialized gaming machine having the software and hardware architecture shown in FIG. 4 according to one embodiment of the present invention.
Figure 6B:
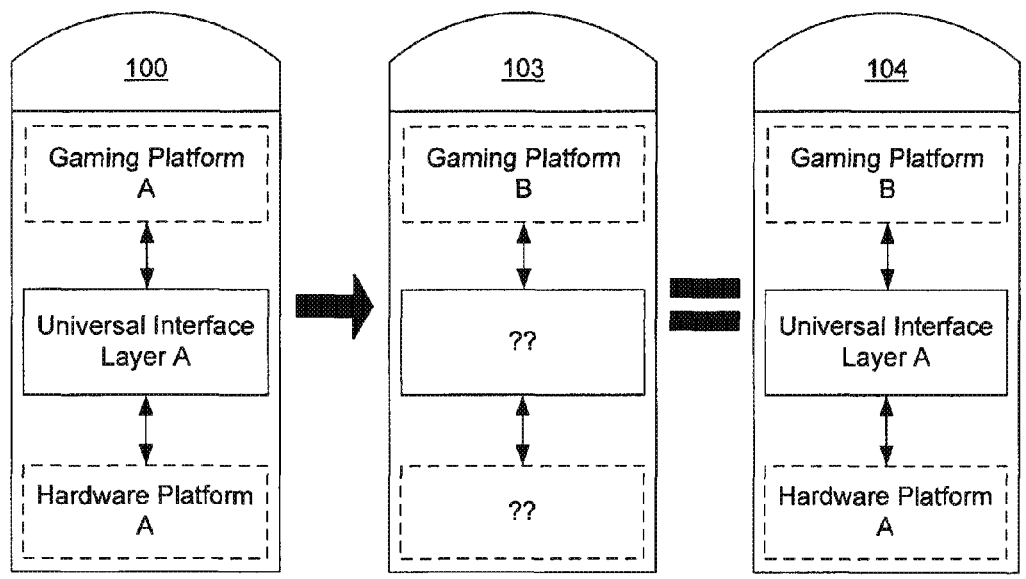
FIG. 6B illustrates in block diagram format one exemplary result of converting the gaming platform in a specialized gaming machine having the software and hardware architecture shown in FIG. 4 according to one embodiment of the present invention.

Turning now to FIGS. 6A and 6B, exemplary results of converting either of the hardware platform or gaming platform of existing gaming machine 100 are illustrated in block diagram format. FIG. 6A shows existing gaming machine 100 as already having a specific Gaming Platform A, a specific Universal Interface Layer A, and a specific Hardware Platform A. If it is desired to alter the Hardware Platform A of this gaming machine substantially, such as, for example, by using a different CPU, adopting a different system I/O bus architecture and/or adding a new ticket printer, among other hardware items, or to replace Hardware Platform A altogether with something different, then a different Hardware Platform B would be created or needed. This is reflected in hypothetical gaming machine 101, which has Hardware Platform B and unknowns as its gaming platform and universal interface layer to go with this hardware platform. For purposes of this discussion, it will be assumed that there is no particular preference for any other gaming platform over the existing Gaming Platform A, such that this existing Gaming Platform A would likely be reused rather than swapped out, if possible. Of course, where changes are desired with respect to both the hardware and gaming platforms, then such changes could be made to both.

Under the inventive gaming machine software and hardware architecture described for gaming machine 100 above, little to no change is required with respect to Gaming Platform A for it to be operable with this new Hardware Platform B. This is due to the fact that the gaming platform is hardware platform independent in the gaming machine software and hardware architecture provided above for specialized gaming machine 100. Any substantial changes that might be needed in order to make the remainder of the existing gaming machine 100 compatible with new Hardware Platform B can be made within the universal interface layer, such as in one or more APIs, hardware specific abstractors and/or firmware components, among other items, such that a new universal interface layer will likely be required. These results are reflected in resulting gaming machine 102, which has the same Gaming Platform A, but a new Universal Interface Layer B to go with the new Hardware Platform B. Although some parts of the universal interface layer must likely be changed, making such changes will usually be much easier and more streamlined than creating an entirely new gaming platform for use with the new hardware platform.

FIG. 6B also shows existing gaming machine 100 as already having a specific Gaming Platform A, specific Universal Interface Layer A, and specific Hardware Platform A. Conversely, however, if it is desired to alter just the Gaming Platform A of this gaming machine substantially, such as, for example, by replacing the existing operating system and various associated compatible high level gaming modules with a different operating system and associated gaming modules, then a different Gaming Platform B would be created or needed. This is reflected in hypothetical gaming machine 103, which has Gaming Platform B and unknowns as its universal interface layer and hardware platform to accompany this new Gaming Platform B. For purposes of this discussion, it will be assumed that there is no particular preference for any other hardware platform over the existing Hardware Platform A, such that this existing Hardware Platform A would likely be reused rather than swapped out, if possible.

Under the inventive gaming machine software and hardware architecture described for gaming machine 100 above, little to no change is required with respect to either of Universal Interface Layer A or Hardware Platform A for these items to be operable with this new Hardware Platform B. This is because the hardware platform, and preferably the universal interface layer as well, can be gaming platform independent in the gaming machine software and hardware architecture given above for specialized gaming machine 100. This result is reflected in resulting gaming machine 104, which has the same Universal Interface Layer A and Hardware Platform A, but a new Gaming Platform B. While this result is certainly easy to accomplish with respect to many hardware specific accommodations being made within the universal interface layer itself, such that the hardware platform need not be changed to accommodate a new gaming platform, it is also preferable that no substantial changes be needed in the universal interface layer either for it to also be compatible with a new gaming platform.

This can be accomplished through various standardization techniques and protocols in the way that disparate gaming platforms are designed for use in gaming machines having the inventive architecture described herein. Callouts, addresses and other specific items with respect to communications between the gaming platform and universal interface layer can be standardized. For example, rather than being custom designed to call a customized location for a given initialization program in firmware during a standard boot process, as is currently done, the Boot Loader 161 within any base operating system designed for use in such a gaming machine architecture can be written such that it calls a particular API within the universal interface of the universal interface layer. Thus, regardless of whether the base operating system used is QNX, Windows CE, or any other commercially available or customized OS, such an operating system can be configured such that its boot loader calls whatever item is at a standardized callout location within the universal interface, which is then where the particular API for this purpose can always be placed in any given universal interface.

Figure 7:
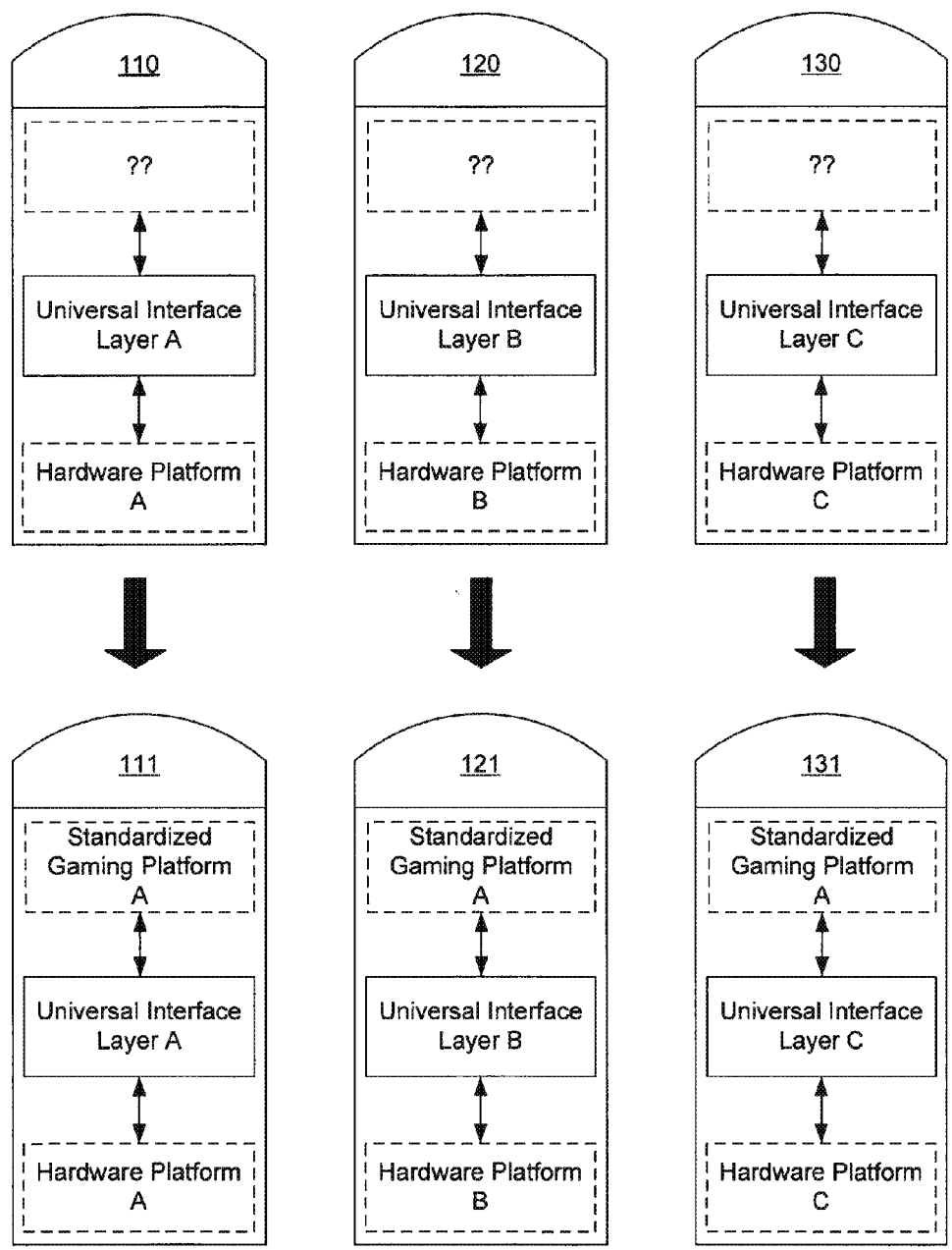
FIG. 7 illustrates in block diagram format one exemplary result of creating specialized gaming machines with disparate hardware platforms while also having the software and hardware architecture shown in FIG. 4 according to one embodiment of the present invention.

Referring next to FIG. 7, one exemplary result of creating various gaming machines with disparate hardware platforms within the inventive general software and hardware architecture described herein is illustrated in block diagram format. Gaming machines 110, 120, 130 are three different gaming machines to be originally manufactured or created, and all three are substantially similar in nature to gaming machine 100 described above with respect to their general software and hardware architectures. These gaming machines can have different titles altogether, or can all have the same title, with the notable difference between them being that each is to have a disparate or substantially different hardware platform. In particular, gaming machine 110 is to have Hardware Platform A and compatible Universal Interface Layer A, gaming machine 120 is to have Hardware Platform B and compatible Universal Interface Layer B, and gaming machine 130 is to have Hardware Platform C and compatible Universal Interface Layer C, with Hardware Platforms A, B and C being disparate from each other. Universal Interface Layers A, B and C may also be disparate from each other as well, as might be necessary to account for differences in the different hardware platforms.

The resulting gaming machines that are manufactured or created turn out to be gaming machine 111, gaming machine 121 and gaming machine 131, with each of these gaming machines 111, 121, 131, having the same or substantially similar Standardized Gaming Platform A. Hence, while the hardware platform from each gaming machine can be substantially different, each gaming machine can still use the same standardized gaming platform, since the gaming platform is hardware platform independent. As noted above, this can be accomplished by accounting for hardware differences in the various modules, APIs and programs of the universal interface layer, such that a single gaming platform can be designed and created for use in a wide variety of different gaming machines. In this manner, a gaming platform that has, for example, a QNX base operating system having a boot loader configured to call a given program (i.e., API) at a set location, and a set of QNX compatible high level engines, managers and drivers can advantageously be created once and then used repeatedly in many different lines and titles of gaming machines, without a need to recreate a customized gaming platform for each such gaming machine line or title.

Pre-Boot Environment and Initialization Process

In addition to the flexibility provided by having gaming platforms that are hardware platform independent, the improved software and hardware architecture of the specialized gaming machines disclosed herein also provides for a significant pre-boot environment. Such a pre-boot environment preferably permits the loading, initialization, authentication and/or execution of various programs or components prior to the execution of a base operating system and corresponding establishment of an ordinary run-time environment. Exemplary methods and systems involving event based console management in a pre-boot environment, and in particular an EFI type of environment, can be found in U.S. Patent Publication No. 2004/0034764, by Bulusu, et al., entitled "Methods And Apparatus For Event Based Console Variable Coherence Maintenance In A Pre-Boot Environment," which is incorporated herein in its entirety and for all purposes. Of course, a variety of other ways of performing tasks and functions in a pre-boot environment are also possible, and it is specifically contemplated that any such suitable method or approach may be used, as desired.

For purposes of illustration, one particular approach will now be discussed in detail, although it will be understood that other approaches may also be used. As noted above, a Boot Manager or similar item is preferably established as the entity that directs activities in a pre-boot environment and then eventually controls the loading and execution of a base operating system and the transition to an ordinary run-time environment under that base operating system. After a start up, reset or other restart condition of the gaming machine, such a Boot Manager preferably reads a stored pre-boot configuration file for instructions on loading and running the various pre-boot applications, drivers and other programs in a pre-boot environment, as desired. Because a pre-boot environment is created whereby various programs and operations are conducted prior to the loading and execution of a base operating system, the entire restart or initialization process for a gaming machine is significantly different in such a specialized gaming machine. As will be readily appreciated, there can be a wide variety of programs available and overall approaches to such an environment beyond the specific examples provided herein.

Figure 8:
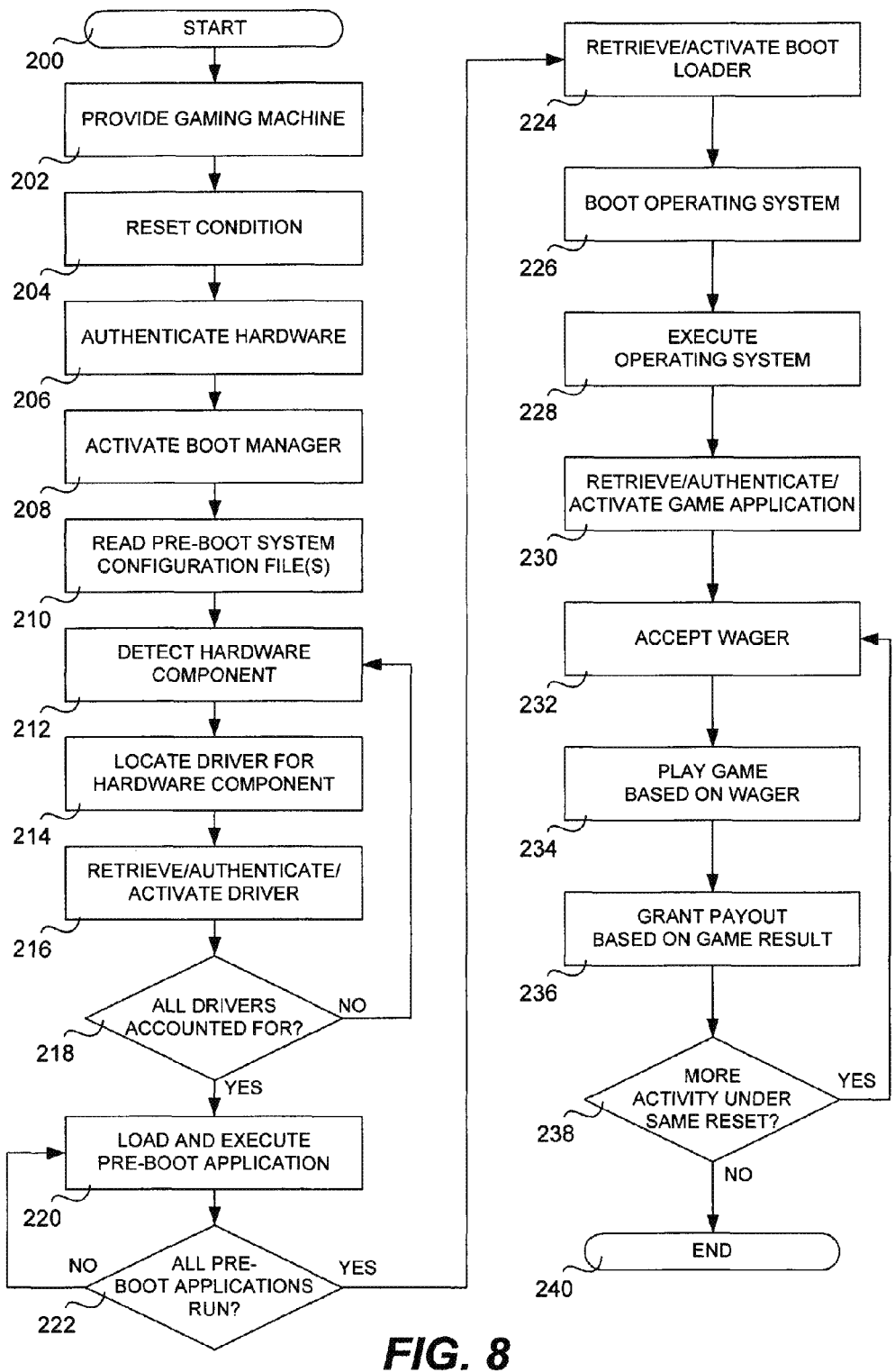
FIG. 8 illustrates a flowchart of an exemplary initialization process of a specialized gaming machine having the software and hardware architecture shown in FIG. 4 according to one embodiment of the present invention.

Turning now to FIG. 8, a flowchart of an exemplary initialization process of a specialized gaming machine having the software and hardware architecture shown in FIG. 4 according to one embodiment of the present invention is illustrated. While this flowchart may be comprehensive in some respects, it will be understood that not every step provided is necessary, that other steps might be included, and that the order of steps might be rearranged as desired by a given gaming operator or gaming machine manufacturer, retrofitter or repairperson. Furthermore, the number, order and types of programs that are utilized in such an initialization process, and in the pre-boot portion of the process in particular, can vary widely, as desired. After a start step 200, a relevant gaming device is provided at a process step 202. While such a device can be a gaming machine, such as one of the specialized gaming machines 100 discussed above, it will also be understood that this device could also be any other relevant item having the specialized software and hardware structures disclosed herein that might be used at a table game, sports book, keno lounge, or other gaming location, for example.

A gaming machine reset is preferably performed at the following process step 204, such as, for example, during an initial power application, a soft reset, or a hard reset where the chips and memory of the system are initialized. A soft reset may occur where the base operating system or main operating routine encounters a situation that calls for a system reset, such as, for example, where a security violation causes the gaming machine to log all current settings and restart. A hard reset may occur where a physical error in the gaming unit is detected, such as, for example, where a watchdog timer is not reset or communication with a vital peripheral cannot be established or maintained. A hard reset typically causes the gaming unit to simulate a power on reset, with all non-persistent variables reset to initial values. The soft reset may only cause portions of the operating system and/or the main operating routine to reset or initialize while preserving state variables elsewhere in the system.

Authentication of one or more hardware components may then occur at a subsequent process step 206 for determining which various system components are known and trusted. The verification may take the form of exchanging a known secret or verifying a public key signature. In gaming machines or devices where reasonable hardware security is available, digital signatures using symmetric keys or keys derived from a master symmetric key may be used. One such algorithm is advanced encryption standard ("AES"). On systems where tamper resistance and/or tamper detection are difficult, asymmetric, or public key, signatures may be used. The choice of symmetric or asymmetric authentication is not restricted to these characteristics however, and may be made depending on a variety of system considerations, as desired. If the hardware verification fails, the gaming machine or apparatus may halt or proceed to a security management function (not shown).

A pre-boot environment Boot Manager is preferably activated at process step 208. In some embodiments, this Boot Manager may be activated prior to step 206 such that the Boot Manager also controls the hardware authentication process. At a following process step 210, this Boot Manager preferably reads one or more pre-boot system configuration files for configuring the pre-boot environment of the gaming machine or system. These pre-boot configuration file or files may contain a list of the number of associated devices or hardware components in the given gaming machine or system, as well as the last known states of the various devices, hardware components and their associated drivers. A given hardware component is detected at process step 212, after which the driver for that hardware component is located at step 214. As will be readily appreciated, drivers are generally the software programs that support the specific protocols and system commands required to both perform the assigned tasks for a given device or hardware component as well as communicate with the host processor. Drivers may reside in several places in program memory, including memory associated with the device itself. When more than one driver is available for a particular device or hardware component, the most appropriate one based on version number, date or other criteria is determined at step 214.

The appropriate driver for a given device or hardware component may then be retrieved at process step 216, and optionally authenticated and/or activated at this step as well. Such an authentication may be performed by a simple checksum, a cryptographic means such as described above, or any other appropriate authorization mechanism. Initial protocol interfaces may be loaded from boot program memory, or the drivers may be loaded from the individual devices themselves. As additional program memory becomes available, such as, for example, from disk drives, drivers may also be loaded from them. These drivers may be written in a variety of source languages, such as C or Java™, and compiled to byte code. A software virtual machine may then interpret the byte code. The advantage of byte code is its high degree of portability between systems. Machine code-specific variations are handled in the interpreter of the virtual machine allowing the byte code to be used across a wide variety of processors and configurations. Additionally, byte code may be scanned for viruses and the code itself may be verified for compatibility and consistency before execution.

Once the appropriate driver is retrieved, authenticated and/or activated, the list of devices in the pre-boot system configuration file or files is preferably checked at decision step 218 to determine whether all hardware components and associated drivers have been accounted for. If not, then the method returns to process step 212 where the process is repeated for steps 212 through 218 for the next hardware component and driver. Among the various drivers loaded, authenticated and/or activated, a driver for the display may be loaded, preferably at or near the beginning of the pre-boot sequence. The Boot Manager can use the drivers to set and control parameters associated with the connected hardware devices, such as, for example, display resolution and scan rate, gaming unit Internet Protocol address, domain name server address, host name, universal serial bus controller identifier, baud rate, and start/stop/parity bit settings, among others.

In a preferred embodiment, the drivers that are initially activated in the pre-boot environment may only enable fundamental system access and control, and/or are limited to operation by the Boot Manager. In addition, the pre-boot system configuration file or files may also provide the location of more advanced drivers that are not initially available for use in the pre-boot environment. In this manner, use of some devices or hardware components may be limited to a basic or streamlined mode, for which only a basic driver is necessary. For example, while a given video screen might be fairly advanced and adapted for complex, high-definition, high refresh rate graphical presentations, a much simpler low definition low refresh rate mode might be all that is needed or used in the pre-boot environment, for which a basic driver is loaded and used. During each cycle through steps 212-218, however, the Boot Manager can be adapted look for more advanced versions of drivers for some devices or hardware components as new portions of program memory become available. Drivers may be updated by stopping only the driver or drivers being replaced, or by a more generic method of stopping all drivers prior to loading and starting the new driver or drivers, or by multiple final updates just prior to loading and executing the base operating system, as desired.

One factor in selecting an appropriate driver may be trust level. Trust level may indicate that even though a driver is not the latest version, it bears a digital signature of a trusted source and therefore is preferred over a generic, perhaps unsigned, driver. The digital signature or other indication of trust may indicate that even though a driver is not the most up to date, the use of the signed version may improve overall system security and therefore be more desirable for use. As noted above, gaming machines are significantly different from PC type computers and devices in many regards. Unlike PCs, gaming machines are typically subjected to severe wear and abuse, particularly from individuals who try to defraud or "game" the gaming machine in a wide variety of abusive ways. Various mechanical components (i.e., hardware components) often need to be replaced as a result, although security concerns are substantially higher for gaming machines for a variety of reasons. Hence, features such as trust level here, authentication, and other security measures noted herein are of particular importance with respect to gaming machines.

When all of the appropriate drivers have been retrieved, authenticated and/or activated as desired, the method then moves from decision step 218 to process step 220, where an application or program designed to operate within the pre-boot environment can be loaded and/or executed. The method then continues to decision step 222, where an inquiry is made as to whether all pre-boot applications and programs have been run, with steps 220 and 222 repeating until this has occurred. Such applications or programs can include, for example, those run by a configurator module, an application downloader module, an authenticator module and/or a diagnostics module, among others. Preferably, the order of application or program loading and execution is set forth in the pre-boot system configuration file or files, as well as any parameters or constraints on the execution of programs in the pre-boot environment. A wide variety of programs, order of load and execution of same, and parameters for same could be implemented for use in a pre-boot environment, as desired by a particular gaming machine designer, operator or other relevant party.

For example, the first application to be loaded in the pre-boot environment might be an authenticator, whereupon an application downloader is then loaded and executed. Use of an application downloader would be particularly appropriate where the Game Application or even the entire Gaming Platform to be used are stored separate from the gaming machine itself, such as on a network. (Such possibilities and the various advantages inherent thereto are made possible in large part through the use of the universal interface layer with the given hardware platform on a given physical gaming machine, such that multiple different Game Applications and/or Gaming Platforms can be used on a given gaming machine without changing the universal interface layer or hardware platform, as detailed above.) The application downloader could then operate to download a Game Application and/or Gaming Platform, or particular portions thereof, to the gaming machine, after which the authenticator could be used to authenticate various downloaded applications and programs.

A diagnostics application might then be loaded and executed to confirm that some or all hardware components and other items are present, are in working order and are configured properly. Of course, such a diagnostics application might also be loaded and run prior to the loading and use of an authenticator and/or application downloader. Alternatively, the authenticator could also be used to authenticate the diagnostics application before it is loaded and/or run. Other programs and/or orders of loading and execution are also possible, and any and all such suitable programs and orders are contemplated for use in a pre-boot environment of a gaming machine as well. In fact, a significant advantage to the implementation of the pre-boot environment is that the authenticator can be used to authenticate any and all applications and programs before execution, as desired.

Once all pre-boot applications have been run, the method continues to process step 224, where the boot loader for loading the base operating system is retrieved and activated, after which the base operating system is booted at process step 226. Preferably, this boot process involves loading the base operating system to the MGC of the gaming machine. The operating system may then be authenticated before execution, if desired. Of course, it may also be possible to retrieve and activate the boot loader and to boot the operating system earlier in the process, with the operating system simply waiting to be executed while one or more activities in the pre-boot environment take place. Given the memory and logistical constraints of such an approach, however, it is thought that booting the operating system after most or all of the pre-boot environment activities have taken place is preferable.

After the operating system has been booted (and authenticated, if desired), it is then executed at process step 228. This step of executing the operating system effectively shifts the gaming machine from a pre-boot environment to an ordinary run-time environment, and transfers control of the gaming machine (i.e., the MGC) from the Boot Manager to the operating system. Unlike many initialization processes and boot loaders for gaming machines, however, the operating system boot loader in this specialized gaming machine architecture no longer must have intimate and potentially transitory information about the specific underlying hardware components and other devices in the gaming machine. The ability of this boot loader to abstract the initial device communication and use the pre-boot system configuration to locate and activate expected devices leads to greater flexibility in configuring devices. The ability of the device to supply its own driver furthers this flexibility.

As the base operating system becomes active, the Boot Manager turns over control of the components (e.g. drivers) of the gaming system to the operating system. In fact, when the operating system is booted and executed, the majority of the pre-boot environment applications and programs, including the Boot Manager, may be shut down and removed from memory. As will be readily appreciated, the base operating system may then configure the gaming machine or device for use by a main operating routine in an ordinary run-time environment. For example, the display, communication ports, such as Internet Protocol ports, input devices, and other peripherals can be activated for use by such a main operating routine, which can be, for example, the main operating routine of a specific Game Application. In such instances, this main operating routine or Game Application is retrieved at process step 230, where it may also optionally authenticated, and then activated as well. Once this Game Application or other main operating routine has been activated and is functioning in the ordinary run-time environment, regular gaming activities may then take place, such as the acceptance of a wager at process step 232, the play of a game based on the wager at process step 234 and the grant of a payout based on a result of the game at process step 236.

After the wager, game play and payout of process steps 232 through 236, the method then continues to decision step 238, where an inquiry is made as to whether any more activity is to take place under the same reset condition. If so, then the method reverts to process step 232 for more gaming activity and a repeat of process steps 232 through 236. If no further gaming activity is to take place under the same gaming machine reset condition, then the method ends at end step 246. The entire method or initialization process would then be repeated for a different reset condition if and when that takes place. Of course, as noted above, one or more steps may be omitted or arranged into a different order, and additional steps not shown or discussed might also be added, as desired.

As seen from the foregoing details, a hardware and software architecture having a universal interface layer is provided in these specialized gaming machines in order not only to abstract the operating system and gaming platform from the hardware platform, but also to provide a pre-boot environment for the loading and execution of various applications and programs prior to executing the base operating system. By using this architectural arrangement, a base operating system in a standardized gaming platform will be able to boot on a variety of system designs without requiring any gaming platform or operating system customization. This arrangement will also allow for gaming platform innovation to introduce new features and functionality that will enhance gaming platform capability without requiring new code to be written in the operating system boot sequence. The universal interface layer can also provide ways to replace legacy devices and firmware code over time. For example, a driver model can be designed to extend the universal interface layer in a way that supports device and bus drivers. These extensions can provide new forms of protocols, new boot services and updated boot services that are backward compatible with their original versions.

The universal interface layer can also define a common pre-boot environment and ordinary run-time abstraction for use by loaded images, which includes drivers, applications, and an operating system boot loader. The Boot Manager can be used to load these images from any file from a universal interface layer defined file system or thorough the use of a defined image loading service. The universal interface layer can also define certain variables stored in NVRAM to be used to point to the file to be loaded, whether on the gaming machine itself or at some remote location, such as on an associated network. The universal interface layer is also preferably responsible for defining the hardware resources used during ordinary run-time operations of the gaming machine. Accordingly, memory used by various universal interface layer items and components is preferably reserved for these items only, and is not ever used by the gaming platform. In this manner, memory needed for standard run-time operation of the universal interface layer should be available to a universal interface layer module or API, and should not be available to or directly manipulated by the gaming platform or any of its components, including the base operating system. In addition, it is preferable that a user be free to write his or her own customized application in the form of a driver or application that is compliant with the universal interface layer, such that it can be loaded and executed by the Boot Manager in the pre-boot environment. Such an ability again allows for a high level of flexibility and a huge variety of possibilities for both customizing and streamlining the operation of any given gaming machine.

Network and System Configurations

Figure 9:
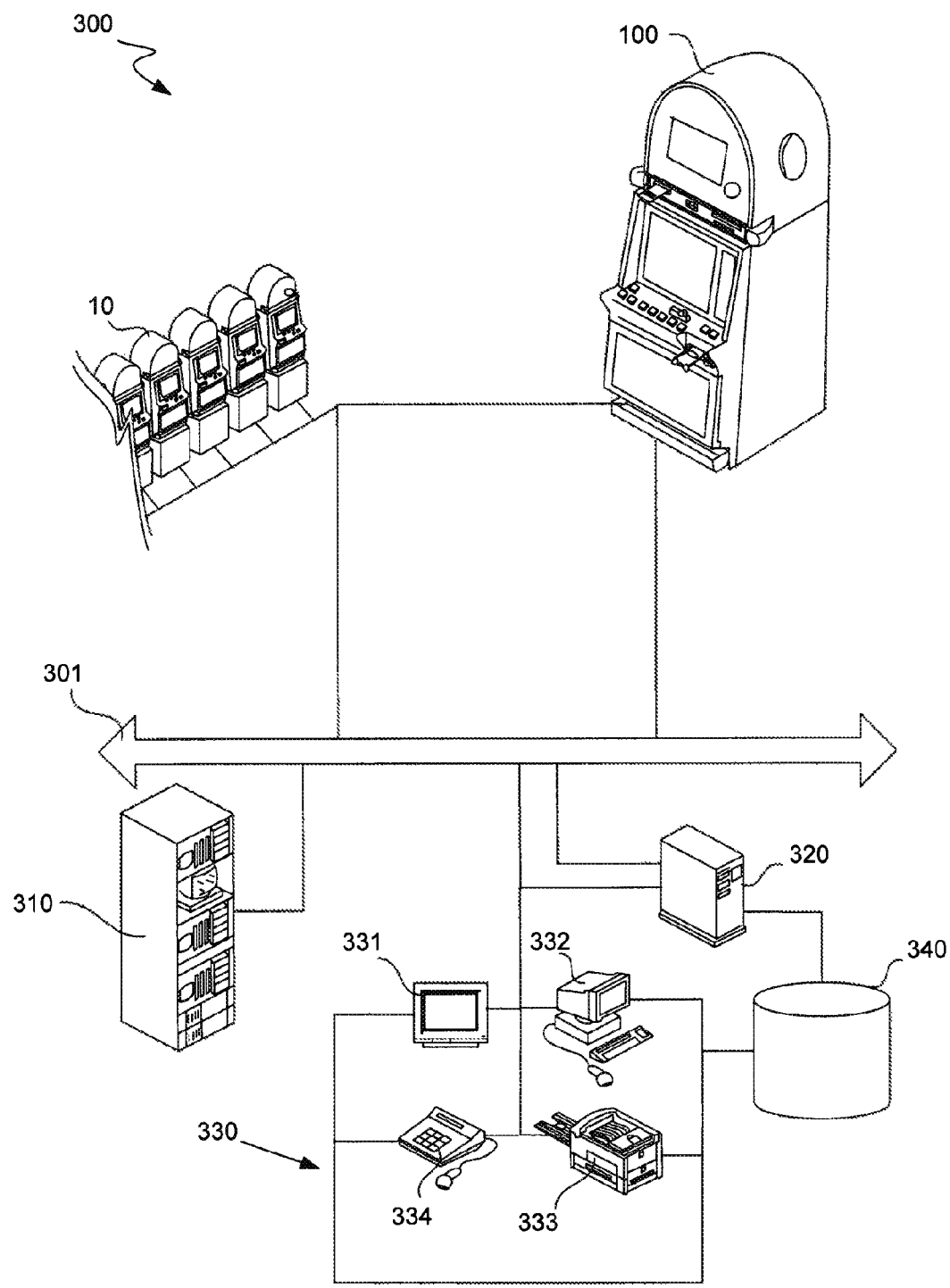
FIG. 9 illustrates a block diagram of an exemplary network infrastructure for providing a gaming system having one or more specialized gaming machines having the software and hardware architecture shown in FIG. 4 according to one embodiment of the present invention.

Turning now to FIG. 9, an exemplary network infrastructure for providing a gaming system having one or more specialized gaming machines according to one embodiment of the present invention is illustrated in block diagram format. Gaming system 300 has one or more specialized gaming machines, various communication items, and a number of host-side components and devices adapted for use within a gaming environment. As shown, one or more specialized gaming machines 100 adapted for use in gaming system 300 can be in a plurality of locations, such as in banks on a casino floor or standing alone at a smaller non-gaming establishment, as desired. Of course, other gaming devices such as non-specialized gaming machine 10 may also be used in gaming system 300, as well as other similar gaming and/or non-gaming devices not described in added detail herein.

Common bus 301 can connect one or more gaming machines or devices to a number of networked devices on the gaming system 300, such as, for example, a general-purpose server 310, one or more special-purpose servers 320, a sub-network of peripheral devices 330, and/or a database 340. Such a general-purpose server 310 may be already present within an establishment for one or more other purposes in lieu of or in addition to monitoring or administering some functionality of one or more specialized gaming machines, such as, for example, providing visual image, video, audio, player tracking details or other data to such gaming machines. Functions for such a general-purpose server can include general and game specific accounting functions, payroll functions, general Internet and e-mail capabilities, switchboard communications, and reservations and other hotel and restaurant operations, as well as other assorted general establishment record keeping and operations.

In some cases, specific gaming related functions such as player tracking, downloadable gaming, remote game administration, visual image, video, audio or other data transmission, or other types of functions may also be associated with or performed by such a general-purpose server. For example, such a server may contain various programs related to player tracking operations, player account administration, remote game play administration, remote game player verification, remote gaming administration, downloadable gaming administration, and/or visual image, video, or audio data storage, transfer and distribution, and may also be linked to one or more gaming machines adapted for the transfer of remote funds for game play within an establishment, in some cases forming a network that includes all or substantially all of the specially adapted gaming devices or machines within the establishment. Communications can then be exchanged from each adapted gaming machine to one or more related programs or modules on the general-purpose server.

In one embodiment, gaming system 300 contains one or more special-purpose servers that can be used for various functions relating to the provision of gaming machine administration and operation under the present system. Such special-purpose servers can include, for example, a player verification server, a general game server, a downloadable games server, a specialized accounting server, and/or a visual image or video distribution server, among others. Of course, these functions may all be combined onto a single server, such as specialized server 320. Such additional special-purpose servers are desirable for a variety of reasons, such as, for example, to lessen the burden on an existing general-purpose server or to isolate or wall off some or all gaming machine administration and operations data and functions from the general-purpose server and thereby limit the possible modes of access to such operations and information.

Alternatively, gaming system 300 can be isolated from any other network at the establishment, such that a general-purpose server 310 is essentially impractical and unnecessary. Under either embodiment of an isolated or shared network, one or more of the special-purpose servers are preferably connected to sub-network 330. Peripheral devices in this sub-network may include, for example, one or more video displays 331, one or more user terminals or cashier stations 332, one or more printers 333, and one or more other digital input devices 334, such as a card reader or other security identifier, among others. Similarly, under either embodiment of an isolated or shared network, at least the specialized server 320 or another similar component within a general-purpose server 310 also preferably includes a connection to a database or other suitable storage medium 340.

Database 340 is preferably adapted to store many or all files containing pertinent data or information for gaming machines, system equipment, casino personnel, and/or players registered within a gaming system, among other potential items. Files, data and other information on database 340 can be stored for backup purposes, and are preferably accessible to one or more system components, such as at a specialized gaming machine 100 a general-purpose server 310, and/or a special purpose server 320, as desired. Database 340 is also preferably accessible by one or more of the peripheral devices on sub-network 330, such that information or data recorded on the database may be readily retrieved and reviewed at one or more of the peripheral devices, as desired. Although shown as directly connected to common bus 301, it is also contemplated that such a direct connection can be omitted and that only a direct connection to a server or other similar device be present in the event that heightened security with respect to data files is desired.

While gaming system 300 can be a system that is specially designed and created new for use in a casino or gaming establishment implementing specialized gaming devices such as gaming machines 100, it is also possible that many items in this system can be taken or adopted from an existing gaming system. For example, gaming system 300 could represent an existing player tracking system to which specialized gaming machines are added. Also, new functionality via software, hardware or otherwise can be provided to an existing database, specialized server and/or general server. In this manner, the methods and systems of the present invention may be practiced at reduced costs by gaming operators that already have existing gaming systems, such as a standard player tracking system, by simply modifying the existing system. Other modifications to an existing system may also be necessary, as might be readily appreciated.

Manufacturing and Converting Specialized Gaming Machines

Figure 10A:
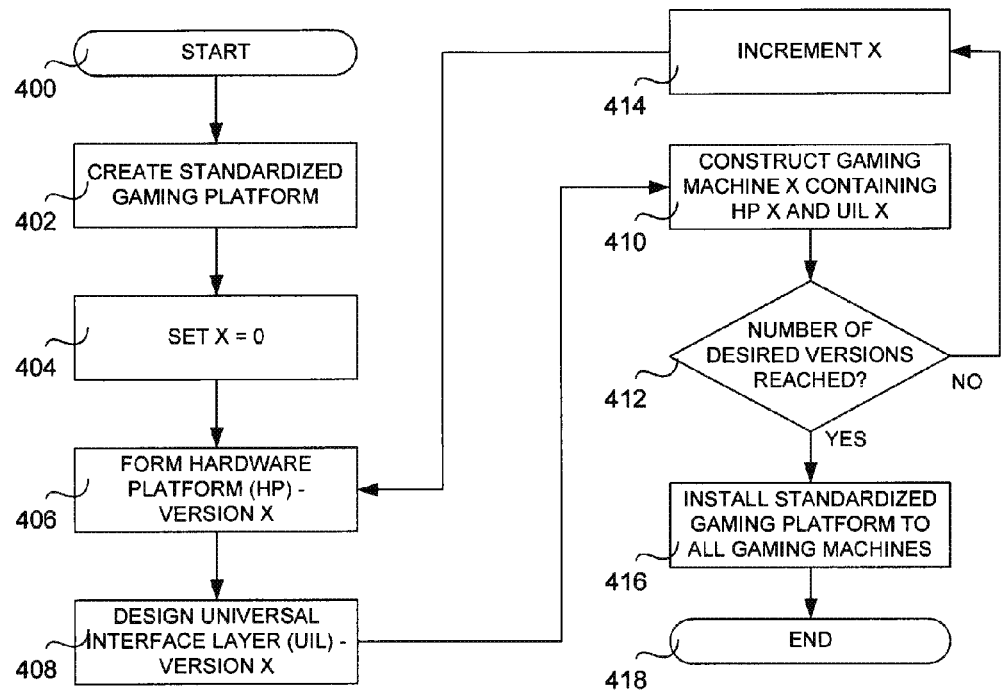
FIGS. 10A and 10B illustrate flowcharts of exemplary processes for manufacturing and converting specialized gaming machines having the software and hardware architecture shown in FIG. 4 according to various embodiments of the present invention.

Referring next to FIG. 10A, a flowchart of one method of manufacturing a plurality of specialized gaming machines according to one embodiment of the present invention is shown. While this flowchart may be comprehensive in some respects, it will be readily understood that not every step provided is necessary, that other steps might be included, and that the order of steps might be rearranged as desired by a given gaming operator, gaming machine manufacturer, retrofitter or repairperson. After start step 400, a standardized gaming platform is created at a process step 402. While such a standardized platform can be created for a gaming machine, such as one of the specialized gaming machines discussed above, it will also be understood that this standardized gaming platform could also be created for any other relevant item having the specialized software and hardware structures disclosed herein that might be used at a table game, sports book, keno lounge, or other gaming location. At a process step 404, a counter "X" is set to 0, with subsequent steps 406 through 414 then comprising a loop that is repeated until this counter "X" reaches the appropriate number (i.e., the number of different versions of gaming machines desired).

At process step 406, a distinct Hardware Platform is formed, with this Hardware Platform being Version X, where X corresponds to the current value of the counter "X." At process step 408, a distinct Universal Interface Layer is designed, with this Universal Interface Layer also being Version X, where X corresponds to the current value of the counter "X." In particular, the Universal Interface Layer-Version X is designed such that it is adapted to function in conjunction with the corresponding Hardware Platform Version X formed in step 406. Although illustrated in a given order, it will be readily appreciated that a given Universal Interface Layer X can be designed before, during or after its corresponding Hardware Platform X is formed. In addition, it will be understood that each Version X for a hardware platform or universal interface layer is substantially disparate from all other versions. In other words, if the desired number of different gaming machines is three, then there will be a Hardware Platform 1, a Hardware Platform 2, and a Hardware Platform 3, with each of these three different hardware platforms being substantially disparate.

At a following process step 410, a Gaming Machine X is constructed containing both. Hardware Platform X and Universal Interface Layer X. Decision step 412 then presents an inquiry as to whether the desired number of different versions of gaming machines have been constructed (i.e., X=appropriate number). If not, then the counter is incremented at process step 414, and steps 406 through 412 are then repeated. If the desired number of different gaming machines have been constructed, however, then the method is continued to process step 416. At step 416 the same standardized gaming platform is installed to all of the constructed gaming machines, whereupon the method ends at end step 418. Of course, different variations and orders of steps are also possible, such as, for example, where the standardized gaming platform is installed to some gaming machines before other gaming machines have been constructed.

Figure 10B:
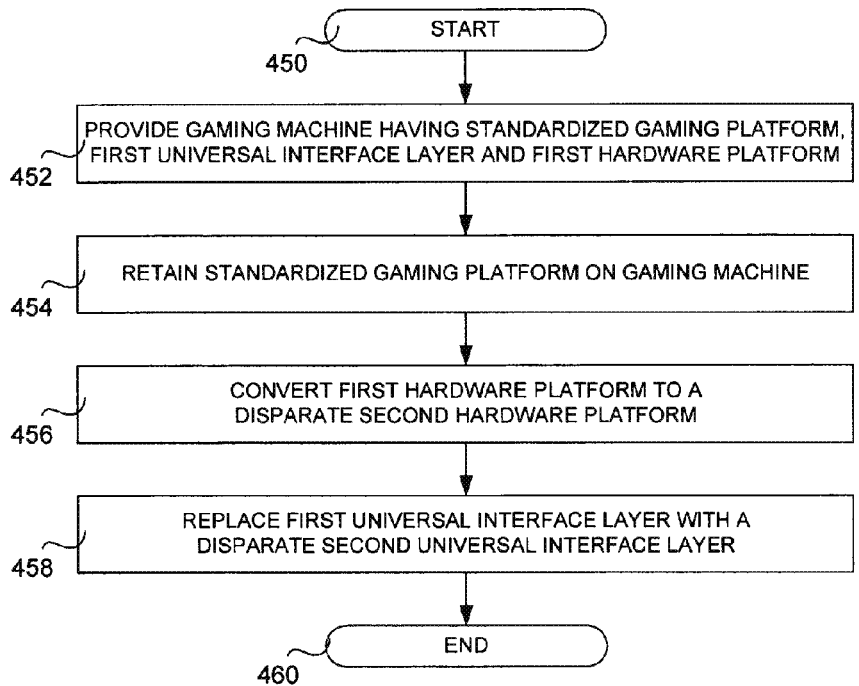

Finally at FIG. 10B, a flowchart of one method of converting a hardware platform on an existing specialized gaming machine according to one embodiment of the present invention is shown. As in the foregoing examples, while this flowchart may be comprehensive in some respects, it will be readily understood that not every step provided is necessary, that other steps might be included, and that the order of steps might be rearranged as desired by a given gaming operator, gaming machine manufacturer, retrofitter or repairperson. After start step 450, a gaming machine having a standardized gaming platform, a first universal interface layer and a first hardware platform is provided at a process step 452. At process step 454, the standardized gaming platform is retained on the provided gaming machine. At process step 456, the first hardware platform is converted to a second hardware platform that is disparate with respect to the first hardware platform. At process step 458, the first universal interface layer is replaced with a second universal interface layer that is disparate with respect to the first universal interface layer. Preferably, this second universal interface layer is adapted to operate in conjunction with the second hardware platform.

While a particular order is illustrated, these steps can in fact be performed in any order, as desired. The process then ends at end step 460.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

The invention claimed is:

1. A method of manufacturing a plurality of gaming machines adapted for accepting wagers, playing games based on the wagers and granting payouts based on results of the games, the method comprising:
creating a standardized gaming platform including an operating system and one or more standardized gaming modules adapted to perform various gaming machine functions, said standardized gaming platform being hardware platform independent;
forming a first hardware platform and a second hardware platform, said first and second hardware platforms being substantially disparate;
designing a first universal interface layer adapted to facilitate communication between said standardized gaming platform and said first hardware platform, wherein the first universal interface layer includes one or more first universal gaming modules;
designing a second universal interface layer adapted to facilitate communication between said standardized gaming platform and said second hardware platform, wherein the second universal interface layer includes one or more second universal gaming modules;
constructing a first gaming machine containing said first hardware platform and said first universal interface layer and a second gaming machine containing said second hardware platform and said second universal interface layer; and
installing said standardized gaming platform in both of said first gaming machine and said second gaming machine.

2. The method of claim 1, wherein said one or more standardized gaming modules include one or more universal function modules operable in conjunction with a non-included second gaming platform without any substantial change to said one or more universal function modules, wherein said second gaming platform is substantially disparate from said first gaming platform.

3. The method of claim 2, wherein at least one of said one or more universal function modules is selected from the group consisting of: an application downloader module, an authentication module, a configuration module and a diagnostics module.

4. The method of claim 2, wherein said one or more universal function modules includes an authentication module, and wherein said authentication module is adapted to authenticate said first operating system prior to loading said first operating system for normal operation of the first gaming machine.

5. The method of claim 2, wherein said one or more universal function modules includes an application downloader module, and wherein said application downloader module is adapted to download additional computer code to at least one of the first gaming machine and the second gaming machine, said additional computer code including a second game application, a second operating system, or both.

6. The method of claim 1, wherein at least one of said one or more standardized gaming modules is selected from the group consisting of: an application downloader module, an authentication module, a configuration module and a diagnostics module.

7. A method comprising:
constructing a first gaming machine containing a first hardware platform and a first universal interface layer;
constructing a second gaming machine containing a second hardware platform and a second universal interface layer; and
installing a standardized gaming platform in both of said first gaming machine and said second gaming machine, wherein
the standardized gaming platform includes an operating system and one or more standardized gaming modules configured to perform various gaming machine functions, the standardized gaming platform being hardware platform independent;
the first hardware platform and the second hardware platform are substantially disparate;
the first universal interface layer is configured to facilitate communication between the standardized gaming platform and the first hardware platform, and the first universal interface layer includes one or more first universal gaming modules; and
the second universal interface layer is adapted to facilitate communication between the standardized gaming platform and the second hardware platform, and the second universal interface layer includes one or more second universal gaming modules.

8. The method of claim 7, wherein the one or more standardized gaming modules include one or more universal function modules operable in conjunction with a non-included second gaming platform without any substantial change to the one or more universal function modules.

9. The method of claim 8, wherein at least one of the one or more universal function modules is selected from the group consisting of: an application downloader module, an authentication module, a configuration module and a diagnostics module.

10. The method of claim 8, wherein the one or more universal function modules include an authentication module configured to authenticate a first operating system prior to loading the first operating system for normal operation of one or both of the first gaming machine and the second gaming machine.

11. The method of claim 8, wherein said one or more universal function modules includes an application downloader module, and wherein said application downloader module is adapted to download additional computer code to one or both of the first gaming machine and the second gaming machine, said additional computer code including a second game application, a second operating system, or both.

12. The method of claim 7, wherein at least one of said one or more gaming modules is selected from the group consisting of: an application downloader module, an authentication module, a configuration module and a diagnostics module.

13. The method of claim 7, wherein at least one of the first gaming machine and said second gaming machine comprise at least one non-volatile storage component adapted to store data regarding an overall state of the electronic gaming machine, and the data regarding the overall state is recoverable from the at least one non-volatile storage component after a substantial interruption to the gaming machine.

14. The method of claim 13, wherein at least one component of the universal interface layer is adapted to receive data regarding the substantial interruption to the gaming machine from a hardware platform of the at least one of the first gaming machine and said second gaming machine.

15. The method of claim 13, wherein the overall state includes the amount of credits on the at least one of the first gaming machine and said second gaming machine and the state of any game being played on the at least one of the first gaming machine and said second gaming machine at the time of the interruption.

* * * * *